(12) United States Patent
Chong et al.

(10) Patent No.: US 12,301,324 B2
(45) Date of Patent: May 13, 2025

(54) WIRELESS COMMUNICATION DEVICE INCLUDING ANTENNA MODULES AND OPERATING METHOD OF WIRELESS COMMUNICATION DEVICE

(71) Applicant: Samsung Electronics Co., Ltd., Suwon-si (KR)

(72) Inventors: Dahae Chong, Seongnam-si (KR); Beomkon Kim, Seoul (KR); Joohyun Do, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/489,360

(22) Filed: Oct. 18, 2023

(65) Prior Publication Data
US 2024/0048210 A1  Feb. 8, 2024

Related U.S. Application Data

(63) Continuation of application No. 17/694,904, filed on Mar. 15, 2022, now Pat. No. 11,824,611.

(30) Foreign Application Priority Data

Mar. 16, 2021  (KR) .................. 10-2021-0034243
Jul. 1, 2021  (KR) .................. 10-2021-0086707

(51) Int. Cl.
*H04L 5/12* (2006.01)
*H04B 7/06* (2006.01)
*H04B 17/309* (2015.01)

(52) U.S. Cl.
CPC ......... *H04B 7/0639* (2013.01); *H04B 7/0608* (2013.01); *H04B 17/309* (2015.01)

(58) Field of Classification Search
CPC ... H04B 7/0639; H04B 17/309; H04B 7/0608
(Continued)

(56) References Cited

U.S. PATENT DOCUMENTS 9,002,287 B2  4/2015  Mow et al.
10,367,558 B2  7/2019  Frank et al.
(Continued)

FOREIGN PATENT DOCUMENTS

EP  1532837 B1  9/2016
JP  S5924569 B2  6/1984
(Continued)

OTHER PUBLICATIONS

European Search Report dated Aug. 10, 2022 for corresponding EP Patent Application No. 22162398.6.
(Continued)

*Primary Examiner* — Zewdu A Kassa
(74) *Attorney, Agent, or Firm* — Harness, Dickey & Pierce, P.L.C.

(57) ABSTRACT

A wireless communication device includes a plurality of antenna modules at different positions, a first radio frequency (RF) integrated circuit, and processing circuitry configured to select one antenna module from among the plurality of antenna modules to obtain a selected antenna module, perform communication using the selected antenna module and the first RF integrated circuit, monitor signal quality through at least one of the plurality of antenna modules to obtain a monitoring result, and control switching from the selected antenna module to another antenna module among the plurality of antenna modules based on the monitoring result, the switching including selectively switching a connection of the first RF integrated circuit from the selected antenna module to the other antenna module.

20 Claims, 25 Drawing Sheets

(58) Field of Classification Search
USPC .............. 375/262, 260, 259, 219, 295, 316
See application file for complete search history.

(56) References Cited

U.S. PATENT DOCUMENTS

| | | | |
|---|---|---|---|
| 2001/0004604 A1* | 6/2001 | Toshimitsu | H01Q 1/246 |
| | | | 455/562.1 |
| 2009/0196372 A1 | 8/2009 | Zhang et al. | |
| 2015/0358055 A1 | 12/2015 | Molisch et al. | |
| 2018/0212668 A1 | 7/2018 | Athley | |
| 2019/0068265 A1* | 2/2019 | Lee | H04B 7/0623 |
| 2019/0132851 A1 | 5/2019 | Davydov et al. | |
| 2019/0363453 A1 | 11/2019 | Yu et al. | |
| 2020/0186227 A1 | 6/2020 | Reider et al. | |
| 2021/0218455 A1 | 7/2021 | Park et al. | |

FOREIGN PATENT DOCUMENTS

| | | | |
|---|---|---|---|
| KR | 10-2014-0120146 A | 10/2014 | |
| KR | 10-2016-0000225 A | 1/2016 | |
| KR | 10-2020-0026648 A | 3/2020 | |
| KR | 102165754 B1 | 10/2020 | |
| KR | 102186869 B1 | 12/2020 | |

OTHER PUBLICATIONS

Office action dated Mar. 13, 2023 for corresponding U.S. Appl. No. 17/694,904.
Notice of Allowance dated Jul. 12, 2023 for corresponding U.S. Appl. No. 17/694,904.
Singapore Office Action, dated Nov. 6, 2024, issued in Singapore Patent Application No. 10202202655P.

* cited by examiner

FIG. 16B

| Channel State | Threshold Number | Offset |
|---|---|---|
| ST1 | N1 | OS1 |
| ST2 | N2 | OS2 |
| ST3 | N3 | OS3 |

TB

WIRELESS COMMUNICATION DEVICE INCLUDING ANTENNA MODULES AND OPERATING METHOD OF WIRELESS COMMUNICATION DEVICE

CROSS-REFERENCE TO RELATED APPLICATIONS

This is a continuation of U.S. application Ser. No. 17/694,904, filed Mar. 15, 2022, which claims priority under 35 U.S.C. § 119 to Korean Patent Application Nos. 10-2021-0086707, filed on Jul. 1, 2021, and 10-2021-0034243, filed on Mar. 16, 2021, in the Korean Intellectual Property Office, the disclosures of which are incorporated by reference herein in their entirety.

BACKGROUND

The inventive concepts relate to a wireless communication device, and more particularly, to a wireless communication device including a plurality of antenna modules and an operating method of the wireless communication device.

$5^{th}$ generation (5G) technology is new radio access technology for providing a high-speed data service of several Gbps by using an ultra-wide band having a bandwidth of 100 MHz or more. This data speed is higher than conventional long term evolution (LTE) and LTE-advanced (LTE-A). However, because it is difficult to secure an ultra-wide band frequency of 100 MHz or more in a frequency band of hundreds MHz or several GHz, which is used in LTE or LTE-A, some 5G communication systems use a method of transmitting a signal by using a wide frequency band in a frequency band of 6 GHz or more. In detail, some 5G communication systems increase a transfer rate by using a millimeter wave band like a 28 GHz band or a 60 GHz band. However, because a path loss of a radio wave is proportional to a frequency band, such 5G communication systems have a characteristic where a path loss of a radio wave is large in a super-high frequency, and due to this, a service range is reduced.

In 5G communication systems, in order to overcome a problem where the service range is reduced, beamforming technology, which generates a directional beam by using a plurality of antennas to increase a range of a radio wave, is becoming an increasingly important issue. The beamforming technology may be applied to each of a transmission device (for example, a base station) and a reception device (for example, a terminal), and decreases interference caused by concentration of physical beams in a target direction, in addition to extending a service range.

SUMMARY

The inventive concepts provide a wireless communication device, which selects an antenna module having best reception quality from among a plurality of antenna modules and effectively performs a switching operation on the antenna module having best reception quality, and an operating method of the wireless communication device.

According to an aspect of the inventive concepts, there is provided a wireless communication device including a plurality of antenna modules at different positions, a first radio frequency (RF) integrated circuit, and processing circuitry configured to select one antenna module from among the plurality of antenna modules to obtain a selected antenna module, perform communication using the selected antenna module and the first RF integrated circuit, monitor signal quality through at least one of the plurality of antenna modules to obtain a monitoring result, and control switching from the selected antenna module to another antenna module among the plurality of antenna modules based on the monitoring result, the switching including selectively switching a connection of the first RF integrated circuit from the selected antenna module to the other antenna module.

According to an aspect of the inventive concepts, there is provided an operating method of a wireless communication device, the operating method including receiving a plurality of first signals from a base station through a transmission beam by sweeping a first plurality of reception beam patterns, the transmission beam being swept to a plurality of transmission beam patterns, and the first plurality of reception beam patterns being formed in each of a plurality of antenna modules, generating a plurality of first indicators based on strengths of the plurality of first signals, the plurality of first indicators representing a signal quality of each of the plurality of antenna modules, selecting one antenna module from among the plurality of antenna modules based on a comparison of the plurality of first indicators to obtain a selected antenna module, and performing communication with the base station using the selected antenna module.

According to an aspect of the inventive concepts, there is provided an operating method of a wireless communication device, the operating method including performing communication with a base station using a selected antenna module among a plurality of antenna modules, monitoring a signal quality through the plurality of antenna modules based on a channel state corresponding to the base station to obtain a monitoring result, and switching the selected antenna module to another antenna module among the plurality of antenna modules based on the monitoring result.

BRIEF DESCRIPTION OF THE DRAWINGS

Embodiments of the inventive concepts will be more clearly understood from the following detailed description taken in conjunction with the accompanying drawings in which:

FIGS. 16A and 16B are diagrams for describing a method of setting an offset and threshold number of a wireless communication device according to embodiments;

DETAILED DESCRIPTION

Figure 1:
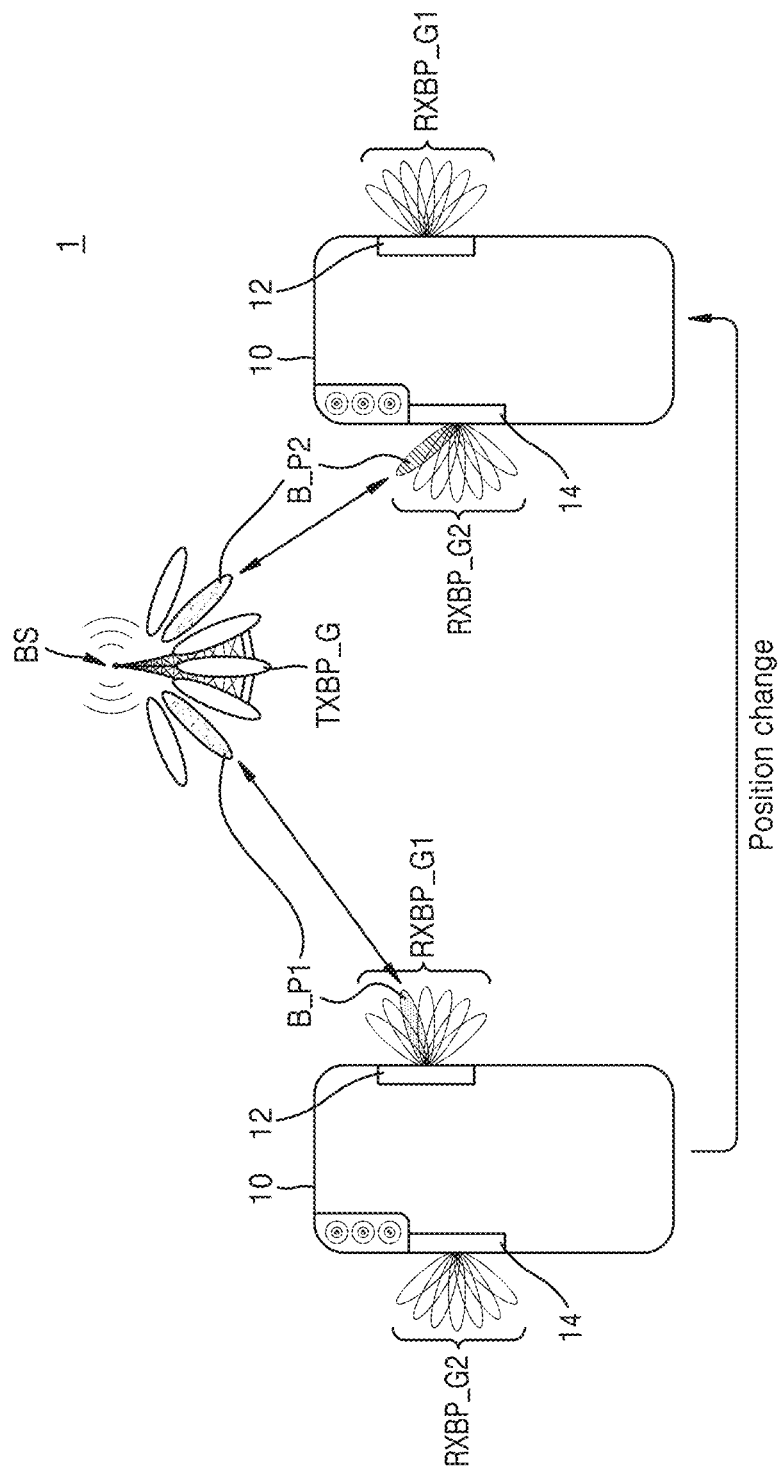
FIG. 1 is a block diagram schematically illustrating a communication system according to embodiments.

FIG. 1 is a block diagram schematically illustrating a communication system 1 according to embodiments. In a non-limiting example, the communication system 1 may be a new radio (NR) system, a $5^{th}$ generation (5G) system, a long term evolution (LTE) system, a code division multiple access (CDMA) system, a global system for mobile communications (GSM) system, a wireless local area network (WLAN) system, and/or another wireless communication system. Hereinafter, an example will be described where the communication system 1 is a system capable of supporting the NR system, or NR and LTE-based communication, but it may be understood that the inventive concepts are not limited thereto.

Referring to FIG. 1, the communication system 1 may include a base station BS and a wireless communication device 10. The wireless communication device 10 may communicate with the base station BS through a downlink channel, and/or an uplink channel, to transmit, and/or receive, at least one of a control signal, a synchronization signal, a reference signal, and/or a data signal. The wireless communication device 10 may be referred to as a terminal, user equipment (UE), a mobile station (MS), a mobile terminal (MT), a user terminal, a subscriber station (SS), a wireless device, and/or a handheld device.

The base station BS may denote a fixed station which communicates with the wireless communication device 10 and/or another base station. The base station BS may be referred to as, for example, a cell, a Node B (NB), an evolved-Node B (eNB), a sector, a site, a base transceiver system (BTS), an access point (AP), a relay node, a remote radio head (RRH), and/or a radio unit (RU).

In embodiments, the wireless communication device 10 may include first and second antenna modules 12 and 14. The first antenna module 12 may be arranged at a position which differs from the second antenna module 14, in the wireless communication device 10 (e.g., the position may be at an opposite side or end of the wireless communication device 10 from the second antenna module 14). Each of the first and second antenna modules 12 and 14 may include a plurality of antennas and a plurality of phase front-ends which are respectively connected to the plurality of antennas to adjust a phase, and their detailed descriptions are given below with reference to FIG. 3. In embodiments, a plurality of beam patterns for transmitting and receiving a signal in a high frequency band may be formed in the first and second antenna modules 12 and 14. For example, the high frequency band may be a millimeter wave band.

In embodiments, the wireless communication device 10 may select one antenna module from among the first and second antenna modules 12 and 14, in order to perform (e.g., for use in performing) communication with the base station BS. The base station BS may transmit certain signals to the wireless communication device 10 by using a plurality of transmission beam patterns included in a transmission beam pattern group TXBP_G. According to embodiments, the base station BS may sweep a transmission beam to the plurality of transmission beam patterns. The wireless communication device 10 may sweep a plurality of reception beam patterns included in a first reception beam pattern group RXBP_G1 of the first antenna module 12, and thus, may receive certain signals from the base station BS. Also, the wireless communication device 10 may sweep a plurality of reception beam patterns included in a second reception beam pattern group RXBP_G2 of the second antenna module 14, and thus, may receive certain signals from the base station BS.

For example, the certain signals may correspond to one of a synchronization signal (for example, a primary synchronization signal (PSS) and/or a secondary synchronization signal (SSS)) and/or a reference signal (for example, a channel state information reference signal (CSI-RS), a demodulate reference signal (DMRS), a sounding reference signal (SRS), and/or a phase-tracking reference signal (PT-RS)).

In embodiments, the wireless communication device 10 may measure strengths of the certain signals received through each of the first and second antenna modules 12 and 14 to generate indicators representing the signal quality of each of the first and second antenna modules 12 and 14. For example, the wireless communication device 10 may sweep the reception beam patterns of the first antenna module 12, and thus, may generate an indicator of the first antenna module 12 on the basis of a maximum (or highest) value of the strengths of the received certain signals. As another example, the wireless communication device 10 may sweep the reception beam patterns of the first antenna module 12, and thus, may generate an indicator of the first antenna module 12 on the basis of an average value of the strengths of the received certain signals. In this manner, the wireless communication device 10 may also generate an indicator of the second antenna module 14.

For example, strengths of certain signals may correspond to one of reference signal received power (RSRP), reference signal received quality (RSRQ), a signal to interference plus noise ratio (SINR), a received signal strength indicator (RSSI), a reference signal correlation, and/or a variable gain index (also referred to herein as parameters), and the signal quality of the first and second antenna modules 12 and 14 may be determined based on the parameters.

In embodiments, the wireless communication device 10 may select an antenna module having a better indicator from among the first and second antenna modules 12 and 14, and as illustrated in FIG. 1, may select the first antenna module 12. The wireless communication device 10 may determine an optimal (or highest signal quality) reception beam pattern in the first reception beam pattern group RXBP_G1 and/or an optimal (or highest signal quality) transmission beam pattern in the transmission beam pattern group TXBP_G and may perform communication with the base station BS by using a first beam pattern pair B_P1 including the determined transmission beam pattern and reception beam pattern. The first beam pattern pair B_P1 may be dynamically changed, and the wireless communication device 10 may provide the base station BS with an uplink signal including information indicating the first beam pattern pair B_P1.

Subsequently, the communication performance of the wireless communication device 10 communicating with the base station BS by using the first antenna module 12 may be reduced due to a position change. In embodiments, the wireless communication device 10 may monitor the signal quality of the first and second antenna modules 12 and 14 and may perform switching from the first antenna module 12 to the second antenna module 14 on the basis of a monitoring result.

In embodiments, when an indicator representing the signal quality of the first antenna module 12 is reduced to less than a threshold value while performing communication by using the first antenna module 12 (e.g., while the first antenna module 12 is selected for use in communication), the wireless communication device 10 may start a monitoring operation performed on the second antenna module 14.

In embodiments, the wireless communication device 10 may perform monitoring on the second antenna module 14 in an interval where a communication operation using the first antenna module 12 is not maximally hindered (or not experiencing a highest degree of hindrance), or may perform monitoring on the second antenna module 14 by using residual radio frequency (RF) resources. This will be described below in detail with reference to FIGS. 9A to 10.

In embodiments, the wireless communication device 10 may sweep the reception beam patterns included in the second reception beam pattern group RXBP_G2 of the second antenna module 14 so as to monitor the signal quality of the second antenna module 14, and thus, may receive certain signals from the base station BS. The wireless communication device 10 may measure strengths of the certain signals to generate an indicator representing the signal quality of the second antenna module 14. In embodiments, the wireless communication device 10 may continuously monitor the signal quality of the first antenna module 12 to update a current indicator of the first antenna module 12. In embodiments, the number of reception beam patterns swept in an initial step of selecting an antenna module for performing communication with a base station may be the same as, similar to or different from the number of reception beam patterns swept in a monitoring step for switching an antenna module. For example, the initial step may include a step of turning on the wireless communication device 10 and performing a network connection with the base station BS. For example, the number of reception beam patterns swept in the monitoring step may be less than the number of reception beam patterns swept in the initial step, and thus, a fast monitoring operation may be performed. Also, the number of reception beam patterns swept in the monitoring step may be the same as or similar to the number of reception beam patterns swept in the initial step, and thus, an accurate monitoring operation may be performed. This will be described below in detail with reference to FIGS. 11A to 11C.

In embodiments, the wireless communication device 10 may compare the current indicator of the first antenna module 12 with an indicator of the second antenna module 14 as a monitoring result and may perform a switching operation from the first antenna module 12 to the second antenna 14 on the basis of a comparison result. For example, the wireless communication device 10 may compare a value, obtained by adding the indicator of the first antenna module 12 to an offset, with the indicator of the second antenna module 14, and when the indicator of the second antenna module 14 is greater than the obtained value, a switching operation for switching to the second antenna module 14 may be performed. In embodiments, the offset may be variably set based on a channel state or a communication environment between the wireless communication device 10 and the base station BS. As described above, the wireless communication device 10 may perform a switching operation through one-time comparison, and thus, may quickly respond to a degradation in signal quality caused by a position change of the wireless communication device 10.

As another example, the wireless communication device 10 may perform, a plurality of times, an operation of generating the indicators of the first and second antenna modules 12 and 14 in a plurality of monitoring intervals based on a monitoring period and comparing the indicator of the first antenna module 12 with the indicator of the second antenna module 14, and when a certain condition is satisfied, a switching operation for switching to the second antenna module 14 may be performed. In embodiments, the certain condition may be variably set based on a channel state between the wireless communication device 10 and the base station BS. This will be described below in detail with reference to FIGS. 14 and 15. As described above, the wireless communication device 10 may perform comparisons a plurality of times to perform a switching operation, thereby reliably improving signal quality.

The wireless communication device 10 may switch from the first antenna module 12 to the second antenna module 14 and may perform communication with the base station BS. The wireless communication device 10 may perform the communication in an interval where the reception loss of a data signal transmitted from the base station BS is minimized (or reduced) in a switching operation, or may use residual RF resources. The wireless communication device 10 may determine an optimal (or highest signal quality) reception beam pattern in the second reception beam pattern group RXBP_G2 of the second antenna module 14 and an optimal (or highest signal quality) transmission beam pattern in the transmission beam pattern group TXBP_G and may perform communication with the base station BS by using a second beam pattern pair B_P2 including the determined transmission beam pattern and reception beam pattern. The second beam pattern pair B_P2 may be dynamically changed, and the wireless communication device 10 may provide the base station BS with an uplink signal including information indicating the second beam pattern pair B_P2.

The wireless communication device 10 according to embodiments may appropriately select an antenna module for communication with the base station BS on the basis of indicators representing the signal quality of the first and second antenna modules 12 and 14, thereby improving communication performance. Also, the wireless communication device 10 may monitor the signal quality of an unselected antenna module and may perform switching from the selected antenna module to another antenna module on the basis of a degradation in signal quality of the selected antenna module caused by a position change, and thus, may stably provide high-performance communication to a user.

Figure 2:
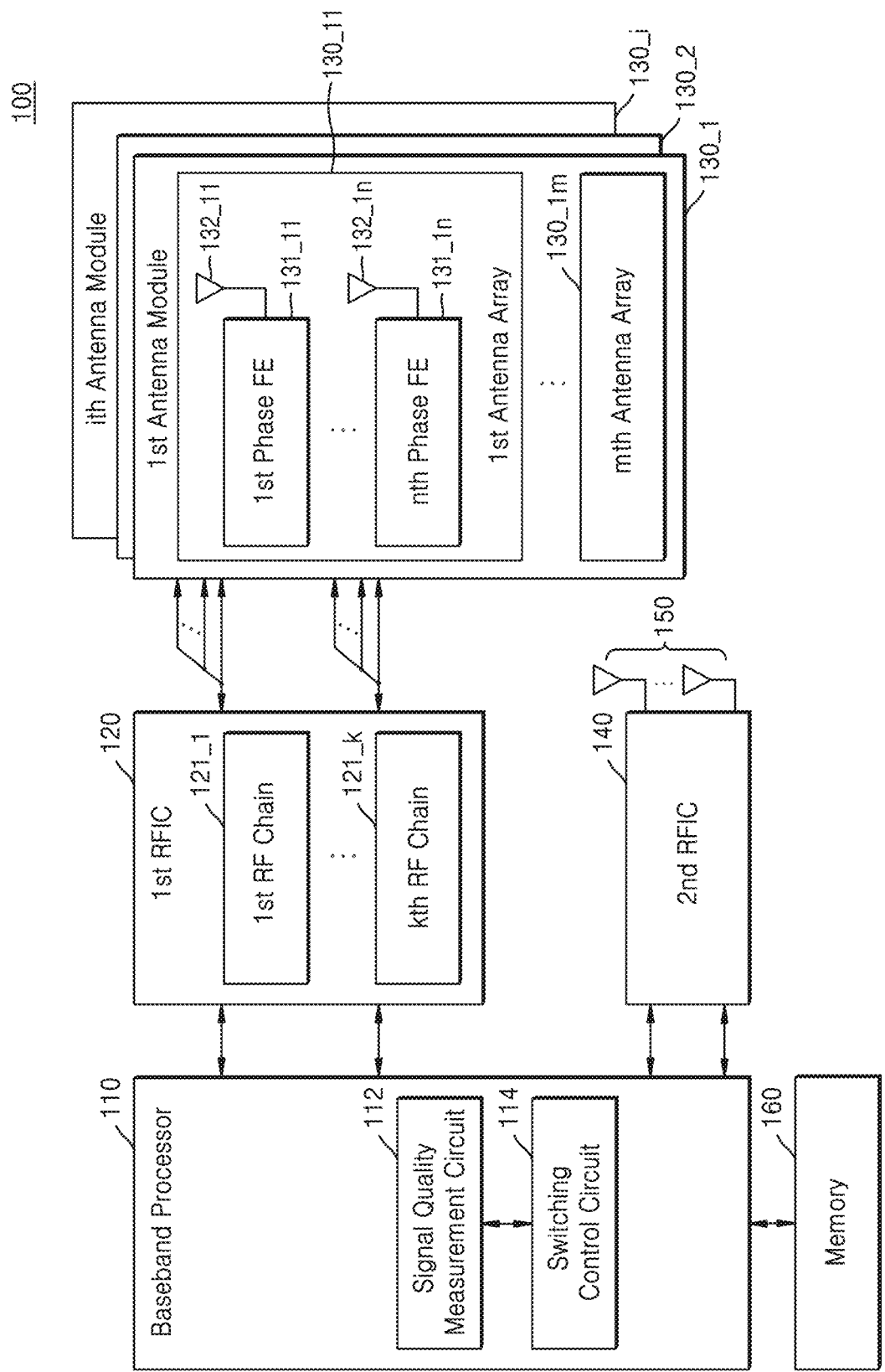
FIG. 2 is a block diagram illustrating a wireless communication device according to embodiments.

FIG. 2 is a block diagram illustrating a wireless communication device 100 according to embodiments.

Referring to FIG. 2, the wireless communication device 100 may include a baseband processor 110, a first radio frequency integrated circuit (RFIC) 120, first to $i^{th}$ antenna modules 130_1 to 130_i, a second RFIC 140, a plurality of antennas 150, and/or a memory 160.

The baseband processor 110 may control overall operations of the wireless communication device 100. In embodiments, the baseband processor 110 may include a signal quality measurement circuit 112 and a switching control circuit 114. The signal quality measurement circuit 112 and the switching control circuit 114 may be implemented as hardware and/or software. It may be understood that an operation of each of the signal quality measurement circuit 112 and the switching control circuit 114 described below is an operation of the baseband processor 110.

In embodiments, the signal quality measurement circuit 112 may select an antenna module for performing communication with a base station or another device, and/or may measure the signal quality of the first to $i^{th}$ antenna modules 130_1 to 130_i so as to switch from a selected antenna module to another antenna module. In embodiments, the signal quality measurement circuit 112 may measure strengths of signals respectively received through the first to $i^{th}$ antenna modules 130_1 to 130_i and may generate indicators respectively representing the signal quality of the first to $i^{th}$ antenna modules 130_1 to 130_i on the basis of the measured strengths of the signals. In embodiments, the signal quality measurement circuit 112 may measure at least one of RSRP, RSRQ, a SINR, a RSSI, a reference signal correlation, and/or a variable gain index.

In embodiments, the switching control circuit 114 may control a connection (e.g., a physical connection, a logical connection, an electrical connection, etc.) between the first to $i^{th}$ antenna modules 130_1 to 130_i and the first RFIC 120 in an initial step for performing communication with a base station or another device, or a monitoring operation for switching an antenna module. The first RFIC 120 may include first to $k^{th}$ RF chains 121_1 to 121_k corresponding to an RF resource. Each of the first to $i^{th}$ antenna modules 130_1 to 130_i may include first to $m^{th}$ antenna arrays 130_11 to 130_1m. Each of the first to $m^{th}$ antenna arrays 130_11 to 130_1m may include first to $n^{th}$ phase front-ends 131_11 to 131_1n and first to $n^{th}$ antennas 132_11 to 132_1n. The switching control circuit 114 may control connections between the first to $k^{th}$ RF chains 121_1 to 121_k and the first to $m^{th}$ antenna arrays 130_11 to 130_1m of the first to $i^{th}$ antenna modules 130_1 to 130_i. According to embodiments, each of the first to $n^{th}$ phase front-ends 131_11 to 131_1n may be connected to a corresponding one of the first to $n^{th}$ antennas 132_11 to 132_1n, and may adjust a phase.

In embodiments, the switching control circuit 114 may control a connection between a selected antenna module and the first RFIC 120 on the basis of indicators of the first to $i^{th}$ antenna modules 130_1 to 130_i generated from the signal quality measurement circuit 112 in the initial step. Also, the switching control circuit 114 may control a connection between at least one unselected antenna module and the first RFIC 120 so as to monitor the signal quality of the at least one unselected antenna module of the first to $i^{th}$ antenna modules 130_1 to 130_i in the monitoring operation. In embodiments, the switching control circuit 114 may control a connection between the at least one unselected antenna module and the first RFIC 120 in an interval where (e.g., in which) receiving of a data signal through a selected antenna module is not hindered, or may control a connection between the at least one unselected antenna module and some usable RF chains of the first to $k^{th}$ RF chains 121_1 to 121_k of the first RFIC 120. Based on a monitoring result generated from the signal quality measurement circuit 112 in the monitoring operation, the switching control circuit 114 may release a connection between the selected antenna module and the first RFIC 120 and may control a connection between another antenna module and the first RFIC 120, thereby performing an antenna module switching operation.

In embodiments, the first RFIC 120 may support communication in the millimeter wave band, and the second RFIC 140 may support communication in a frequency band, which is lower than the millimeter wave band. The second RFIC 140 may be selectively connected to the plurality of antennas 150.

In embodiments, the memory 160 may store indicators of the first to it h antenna modules 130_1 to 130_i in the initial operation or the monitoring operation. The memory 160 may store pieces of information used for connection control between the first RFIC 140 and the first to $i^{th}$ antenna modules 130_1 to 130_i. In embodiments, the signal quality measurement circuit 112 and the switching control circuit 114 may be implemented as software and may be stored as a code type in the memory 160. Also, switching history information to be described below with reference to FIG. 7 may be stored in the memory 160. In embodiments, the memory 160 may be implemented as a volatile memory such as static random access memory (SRAM) and/or dynamic random access memory (DRAM), and/or may be implemented as a non-volatile memory such as read only memory (ROM), flash memory, resistive random access memory (ReRAM), and/or magnetic random access memory (MRAM).

However, embodiments of the wireless communication device 100 illustrated in FIG. 2 are merely examples, and the inventive concepts are not limited thereto and various implementation examples suitable for performing an operation based on the inventive concepts may be applied.

Figure 3:
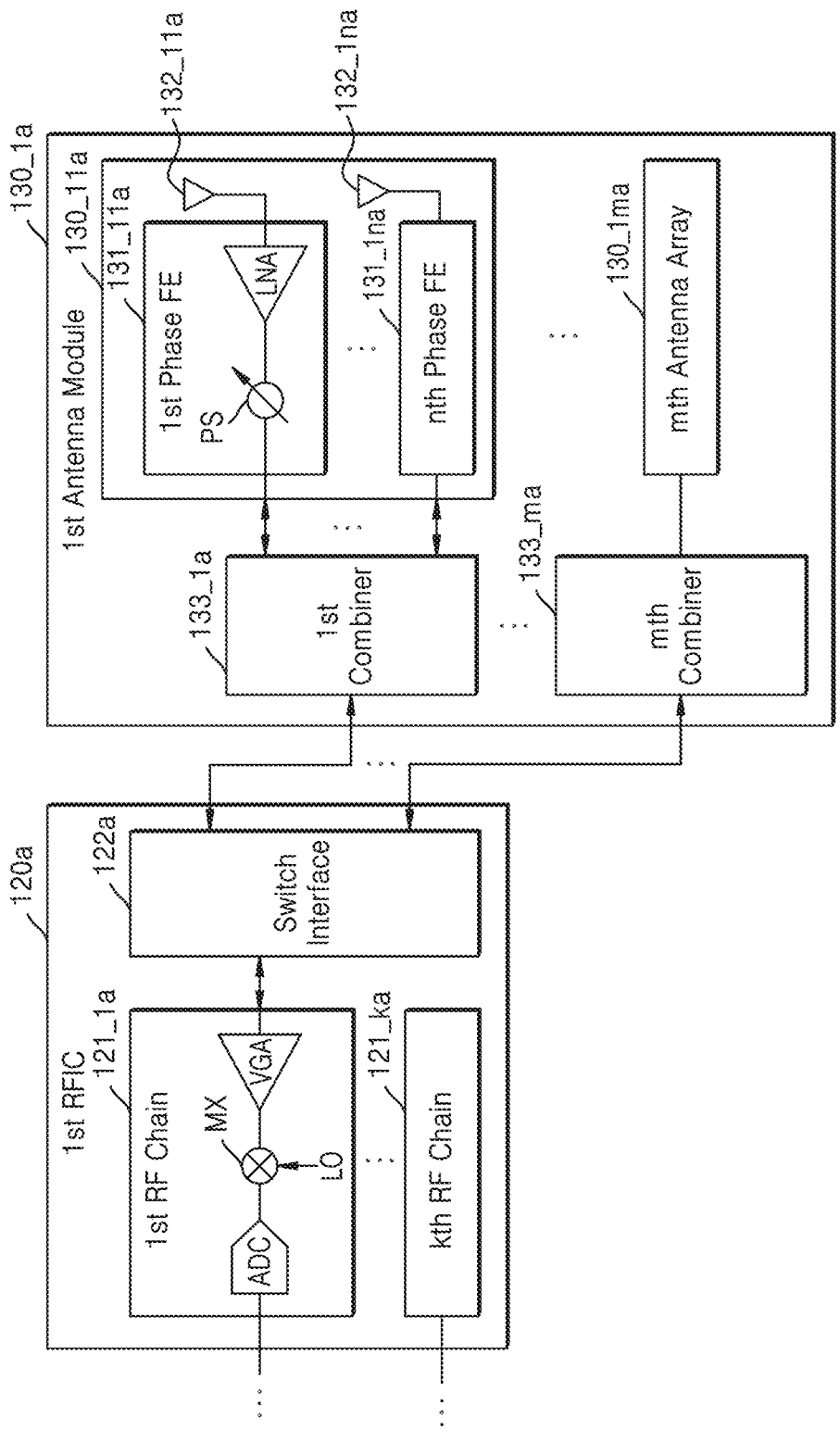
FIG. 3 is a block diagram for describing a detailed implementation example of a first radio frequency integrated circuit (RFIC) and a first antenna module of FIG. 2.

FIG. 3 is a block diagram for describing a detailed implementation example of the first RFIC 120 and the first antenna module 130_1 of FIG. 2. An implementation example of a first antenna module 130_1a described with reference to FIG. 3 may be applied to the second to $i^{th}$ antenna modules 130_2 to 130_i of FIG. 2.

Referring to FIG. 3, a first RFIC 120a may include first to $k^{th}$ RF chains 121_1a to 121_ka and/or a switch interface 122a. Each of the first to $k^{th}$ RF chains 121_1a to 121_ka may include an analog-digital converter ADC, a mixer MX, and/or a variable gain amplifier VGA. The variable gain amplifier VGA may amplify a received signal on the basis of a variable gain, the mixer MX may frequency-down-convert the amplified signal on the basis of a frequency signal LO (e.g., from a local oscillator of the wireless communication device 100 (not shown)), and the analog-digital converter ADC may convert a converted signal (e.g. the frequency-down-converted signal) into a digital signal. The digital signal output from the analog-digital converter ADC may be provided to the baseband processor 110 of FIG. 2. The analog-digital converter ADC, the mixer MX, and the variable gain amplifier VGA may form a path of a signal received by a wireless communication device, and the first to $k^{th}$ RF chains 121_1a to 121_ka of FIG. 3 may further include a plurality of elements which form a path of a signal transmitted by the wireless communication device. The switch interface 122a may connect the first to $k^{th}$ RF chains 121_1a to 121_ka to the first antenna module 130_1a in response to the switch control signal.

The first antenna module 130_1a may include first to $m^{th}$ antenna arrays 130_11a to 130_1ma (e.g., first antenna array 130_11a, second antenna array 130_12a (not depicted) . . . and $m^{th}$ antenna array 130_1ma) and/or first to $m^{th}$ combiners 133_1a to 133_ma. An implementation example of the first antenna array 130_11a may be applied to the second to $m^{th}$ antenna arrays 130_12a to 130_1ma. Each of the first to $m^{th}$ antenna arrays 130_11a to 130_1ma may include first to $n^{th}$ phase front-ends 131_11a to 131_1na and/or first to $n^{th}$ antennas 132_11a to 132_1na respectively connected to the first to $n^{th}$ phase front-ends 131_11a to 131_1na. Each of the first to $n^{th}$ phase front-ends 131_11a to 131_1na may include a phase shifter PS and/or a low noise amplifier LNA. A plurality of reception beam patterns may be formed in the first antenna module 130_1a on the basis of phase control by a plurality of phase shifters PS included in the first antenna module 130_1a. The first to $m^{th}$ combiners 133_1a to 133_ma may summate (e.g., sum) signals received from the first to $m^{th}$ antenna arrays 130_11a to 130_1ma respectively connected thereto to output a summated signal to the first RFIC 120a.

Embodiments of the first RFIC 120a and the first antenna module 130_1a depicted in FIG. 3 are merely examples, and the inventive concepts are not limited thereto and various embodiments suitable for communication in the millimeter wave band may be implemented.

Figure 4A:
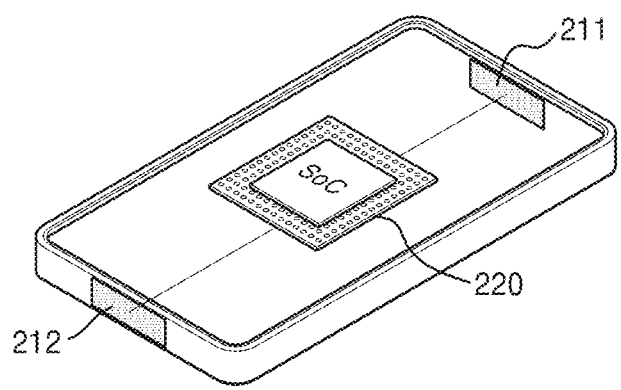
FIGS. 4A and 4B are diagrams illustrating an implementation example of a wireless communication device according to embodiments.
Figure 4B:
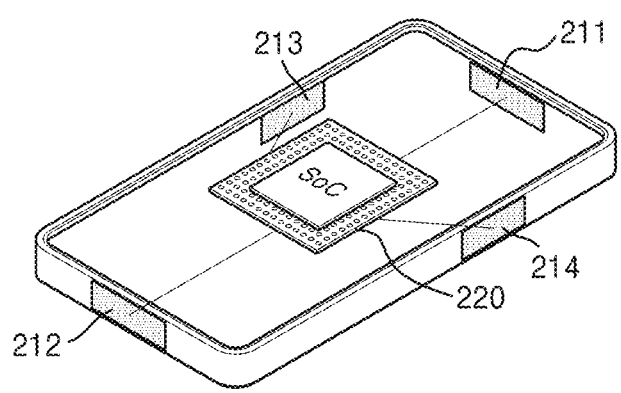

FIGS. 4A and 4B are diagrams illustrating an implementation example of wireless communication devices 200a and 200b according to embodiments.

Referring to FIG. 4A, the wireless communication device 200a may include a first antenna module 211, a second antenna module 212, and/or a system on chip 220. The system on chip 220 may include a baseband processor to which embodiments are applied. In embodiments, the first antenna module 211 may be arranged on the wireless communication device 200a, and the second antenna module 212 may be arranged under the wireless communication device 200b. The system on chip 220 may select one antenna module from among the first and second antenna modules 211 and 212 and may use the selected one antenna module in communication, and moreover, may switch to another antenna module on the basis of a position change of the wireless communication device 200a or a state of the selected antenna module. The system on chip 220 may generate indicators representing the signal quality of the first and second antenna modules 211 and 212, for a selection or switching operation performed on an antenna module.

Referring further to FIG. 4B, the wireless communication device 200b may include first to fourth antenna modules 211 to 214 and a system on chip 220. In embodiments, the first antenna module 211 may be arranged at an upper end of the wireless communication device 200a, the second antenna module 212 may be arranged at a lower end of the wireless communication device 200b, the third antenna module 213 may be arranged at a left end of the wireless communication device 200b, and the fourth antenna module 214 may be arranged at a right end of the wireless communication device 200b. The system on chip 220 may select one antenna module from among the first to fourth antenna modules 211 to 214 and may use the selected one antenna module in communication, and moreover, may switch to another antenna module on the basis of a position change of the wireless communication device 200b or a state of the selected antenna module. The system on chip 220 may generate indicators representing the signal quality of the first to fourth antenna modules 211 to 214, for a selection or switching operation performed on an antenna module.

However, the illustrations of FIGS. 4A and 4B are merely embodiments, and the inventive concepts are not limited thereto and a wireless communication device may be implemented so that a various number of antenna modules are arranged at different positions.

Figure 5:
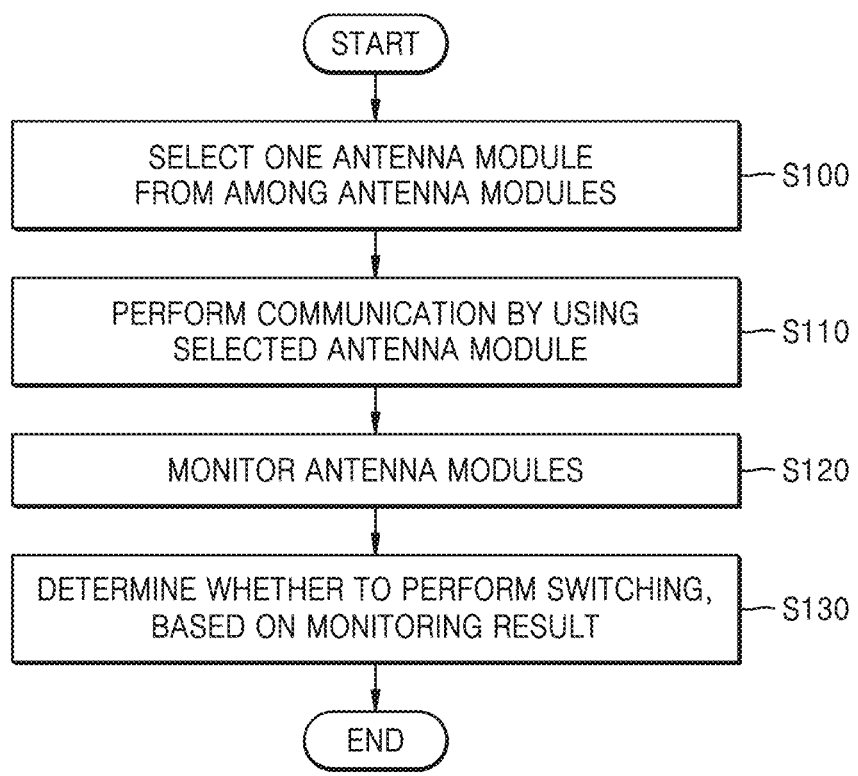
FIG. 5 is a flowchart illustrating an operating method of a wireless communication device according to embodiments.

FIG. 5 is a flowchart illustrating an operating method of a wireless communication device according to embodiments.

Referring to FIG. 5, in operation S100, the wireless communication device may select one antenna module from among a plurality of antenna modules, for communication with a base station or another device. When the wireless communication device is turned on, the wireless communication device may select an antenna module used in an initial operation (for example, base station search, a radio resource control (RRC) connection, etc.). The wireless communication device may generate indicators respectively representing the signal quality of a plurality of antenna modules so as to select an antenna module. A detailed example of indicators will be described below with reference to FIG. 6. The wireless communication device may compare the generated indicators to select an antenna module having best signal quality.

In operation S110, the wireless communication device may perform communication by using the selected antenna module. The wireless communication device may generate a reception beam pattern in the selected antenna module to receive a control signal and a data signal from a base station or another device. The wireless communication device may dynamically change the reception beam pattern in the selected antenna module and may maintain reception quality.

In operation S120, the wireless communication device may monitor a plurality of antenna modules. That is, the wireless communication device may periodically or aperiodically monitor the selected antenna module and an unselected antenna module. The wireless communication device may monitor the reception quality of the selected antenna module and the unselected antenna module so as to switch to an antenna module, in response to the reception quality of the selected antenna module becoming degraded due to various causes such as a position change of the wireless communication device. The unselected antenna module may be provided as one or in plurality, on the basis of the number of antenna modules included in the wireless communication device. In embodiments, the wireless communication device may perform a monitoring operation on the unselected antenna module by using residual RF resources or in an interval where communication using the selected antenna module is not hindered.

In operation S130, the wireless communication device may determine whether to switch from the selected antenna module to another antenna module, on the basis of a monitoring result. The wireless communication device may check whether the monitoring result satisfies a certain condition, and when the monitoring result satisfies the certain condition, the wireless communication device may switch the selected antenna to another antenna module. In embodiments, the certain condition may be variably set based on a current channel state or communication environment of the wireless communication device. The certain condition may include an offset and a threshold number, which are considered in comparing indicators, and its detailed description will be given below.

Figure 6:
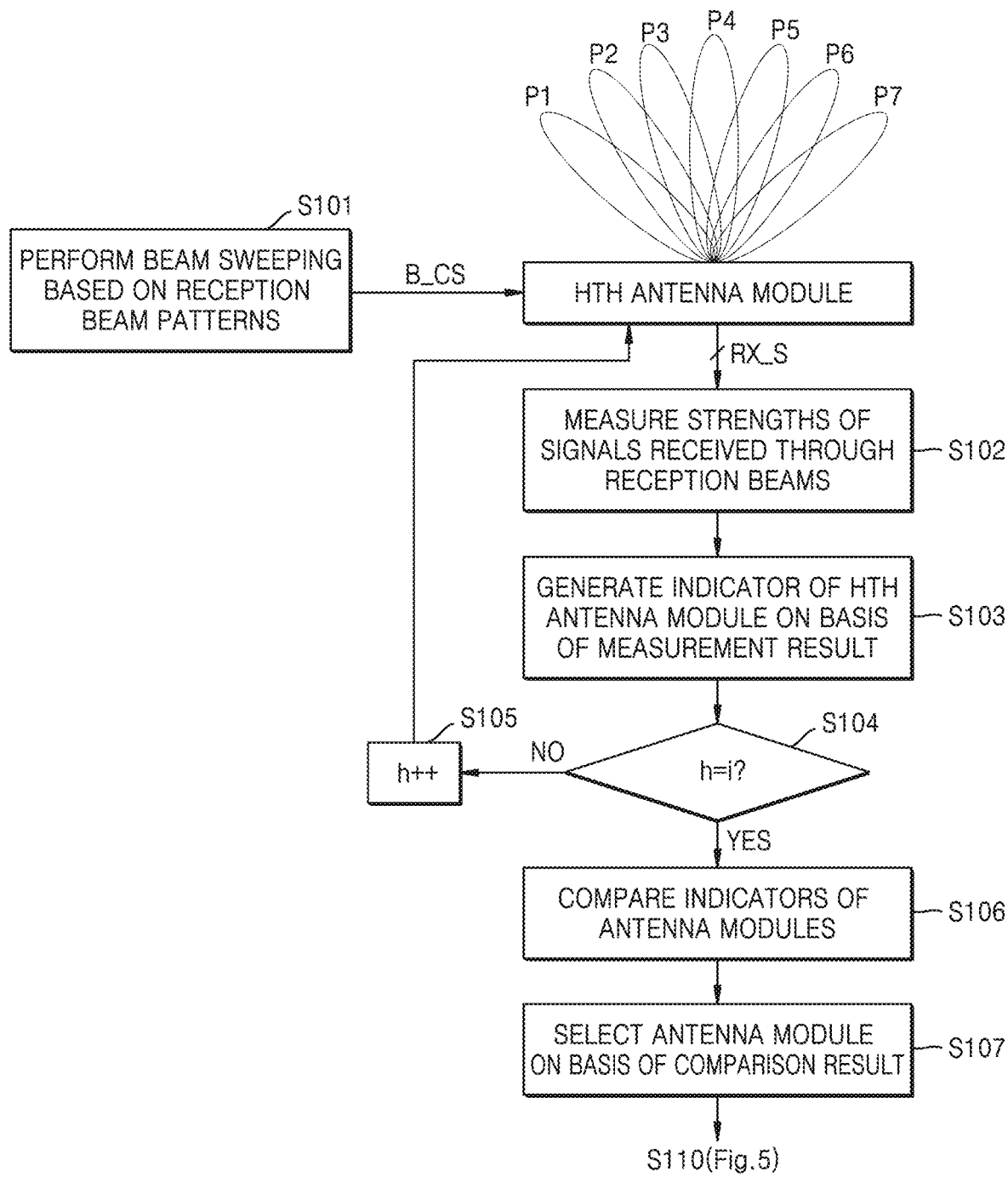
FIG. 6 is a flowchart illustrating a detailed operating method of a wireless communication device in operation S100 of FIG. 5.

FIG. 6 is a flowchart illustrating a detailed operating method of a wireless communication device in operation S100 of FIG. 5. An indicator generating method described with reference to FIG. 6 may be applied to an indicator generating method used in connection with for antenna module switching in a monitoring operation. In FIG. 6, it may be assumed that seven reception beam patterns are provided in order to help understanding, but the inventive concepts are not limited thereto and may be applied to a case where more wireless communication devices are provided or fewer reception beam patterns are used.

Referring to FIG. 6, in operation S101, the wireless communication device may provide a beam control signal B_CS to an $h^{th}$ antenna module to perform (e.g., to cause the $h^{th}$ antenna module to perform) beam sweeping on reception beam patterns. First to seventh reception beam patterns P1 to P7 may be sequentially generated in the $h^{th}$ (where h is 1 or more) antenna module and may receive certain signals RX_S from a base station. In operation S102, the wireless communication device may measure strengths of the signals RX_S. In embodiments, the signals RX_S may each be a synchronization signal or a reference signal. In operation S103, the wireless communication device may generate an indicator of the $h^{th}$ antenna module on the basis of a measurement result. In embodiments, the wireless communication device may generate the indicator of the $h^{th}$ antenna module on the basis of [Equation 1].

$$I[h] = \max\{P_{q,r}\} \quad \text{[Equation 1]}$$

Here, 'I[h]' may denote the indicator of the $h^{th}$ antenna module, 'P' may denote strength of a signal, 'q' may denote a transmission beam pattern transmitting a signal in the base station, and 'r' may denote a reception beam pattern of the $h^{th}$ antenna module. That is, the wireless communication device may receive signals, transmitted through each of a plurality of transmission beam patterns of the base station, through all of the first to seventh reception beam patterns P1 to P7 formed in the $h^{th}$ antenna module and may determine a maximum (or highest) value of the strengths of the received signals RX_S as the indicator of the $h^{th}$ antenna module.

In embodiments, the wireless communication device may generate the indicator of the $h^{th}$ antenna module on the basis of [Equation 2].

$$I[h] = \frac{\sum_{q=1}^{Q}\sum_{r=1}^{7} P_{q,r}}{T} \quad \text{[Equation 2]}$$

Here, 'I[h]' may denote the indicator of the $h^{th}$ antenna module, 'P' may denote strength of a signal, 'q' may denote a transmission beam pattern transmitting a signal in the base station, 'Q' may denote the number of transmission beam patterns of the base station, 'r' may denote a reception beam pattern of the $h^{th}$ antenna module, and 'T' may denote the total number of strengths of signals. That is, the wireless communication device may determine an average value of the strengths of the received signals RX_S as the indicator of the $h^{th}$ antenna module.

In embodiments, the wireless communication device may apply a weight value to the strengths of the received signals RX_S or may apply a filter thereto, thereby generating an indicator.

In operation S104, the wireless communication device may determine whether 'h' reaches 'i'. Here, 'i' may denote the total number of antenna modules, and the wireless communication device may check whether indicators of all antenna modules are generated, in operation S104. When 'NO' results in operation S104, the wireless communication device may count up (e.g., increment) 'h' in operation S105 subsequent thereto, and operations S101 to S104 may be repeated. When 'YES' results in operation S104, the wireless communication device may compare indicators of a plurality of antenna modules in operation S106 subsequent thereto. In operation S107, the wireless communication device may select an antenna module on the basis of a comparison result. In embodiments, the wireless communication device may select an antenna module having a best indicator (e.g., highest signal quality). Subsequently, operation S110 of FIG. 5 may be performed. According to embodiments, 'h' may be initiated to '1' prior to performing the operating method illustrated in FIG. 6.

Figure 7:
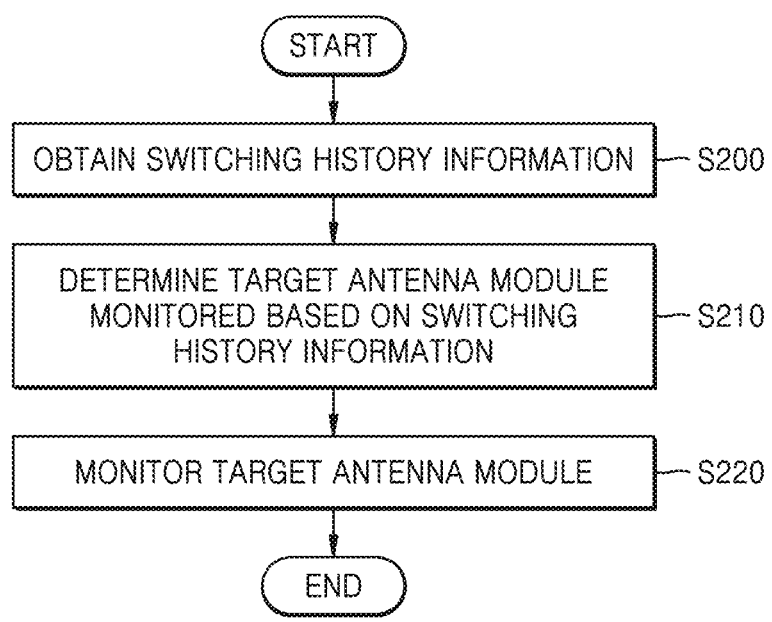
FIG. 7 is a flowchart illustrating a selective monitoring operation method of a wireless communication device according to embodiments.

FIG. 7 is a flowchart illustrating a selective monitoring operation method of a wireless communication device according to embodiments.

Referring to FIG. 7, in operation S200, the wireless communication device may obtain switching history information. The switching history information may include a tendency of an antenna module switched from a currently selected antenna module. That is, because a position of the wireless communication device is changed based on the movement of a user, the wireless communication device may depend on the movement of the user, and the movement of the user may have a certain pattern at a specific time and a specific location. Based thereon, when there are a plurality of unselected antenna modules, all of the unselected antenna modules may not be monitored, and only some unselected antenna modules may be selectively monitored. The switching history information may be generated through machine learning such as deep learning and may be continuously updated by applying a recent switching history of the wireless communication device. According to embodiments, the wireless communication device may monitor antenna module switching on the wireless communication device and corresponding situation data (e.g., a current time and/or a current location of the wireless communication device), and store resulting switching history information (e.g., in the memory of the wireless communication device). According to embodiments, the switching history information may include associations between specific antenna modules and corresponding situation data (e.g., relating to times and/or locations at which switching to the specific antenna modules is performed).

In operation S210, the wireless communication device may determine a target antenna module to be monitored, on the basis of the switching history information. For example, a first antenna module may be selected from among first to third antenna modules, and when there is a tendency where an antenna module is switched to the second antenna module at a specific time or a specific location, the wireless communication device may determine the second antenna module as the target antenna module. According to embodiments, the wireless communication device may detect and/or track situation data (e.g., a current time and/or a current location of the wireless communication device), and determine the target antenna module based on the switching history information and the situation data.

In operation S220, the wireless communication device may monitor the target antenna module. When a monitoring result of the target antenna module satisfies a certain condition, the wireless communication device may perform a switching operation for switching to the target antenna module.

Figure 8A:
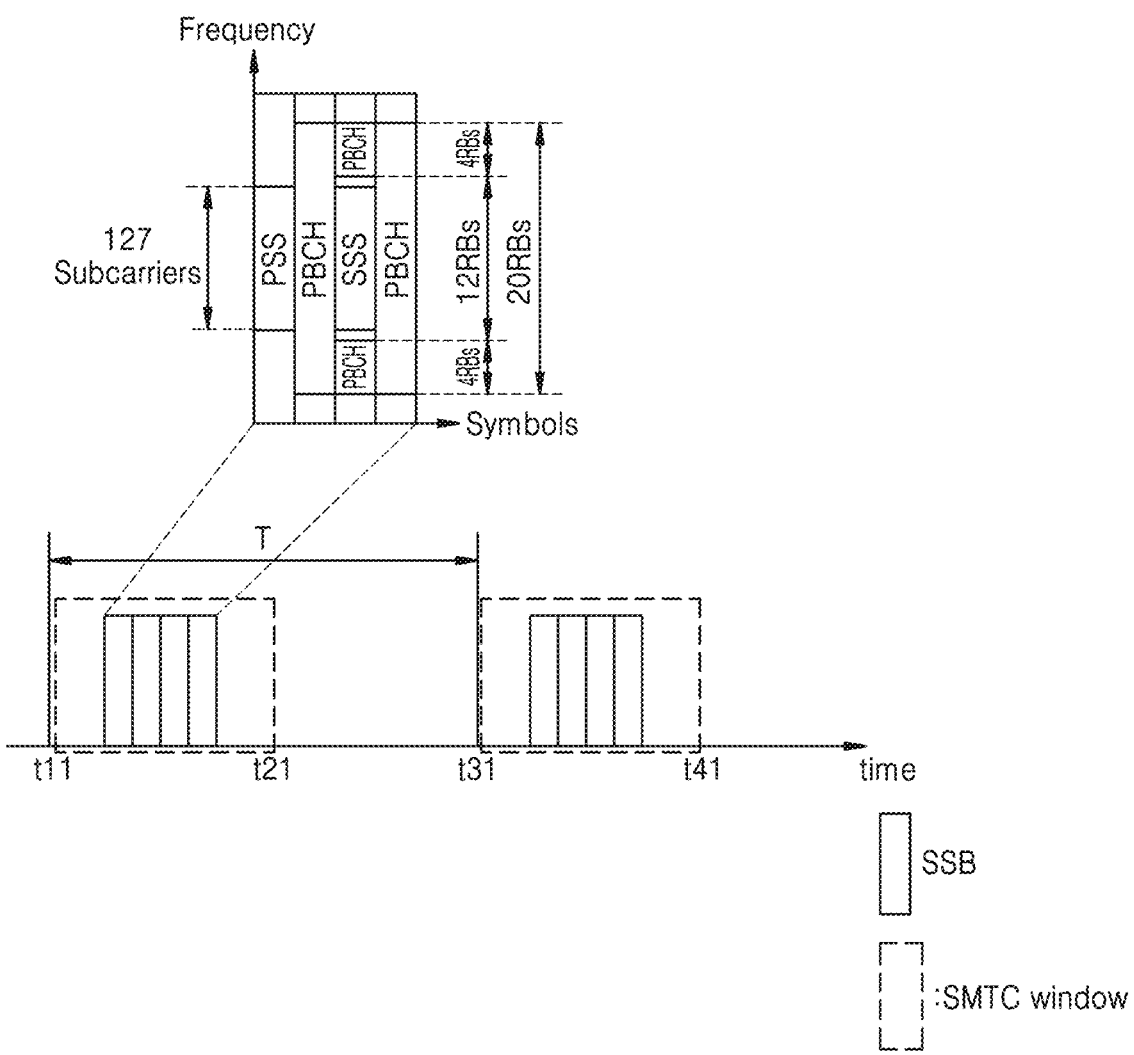
FIGS. 8A and 8B are diagrams for describing an interval where monitoring of a wireless communication device, according to embodiments, is performed.
Figure 8B:
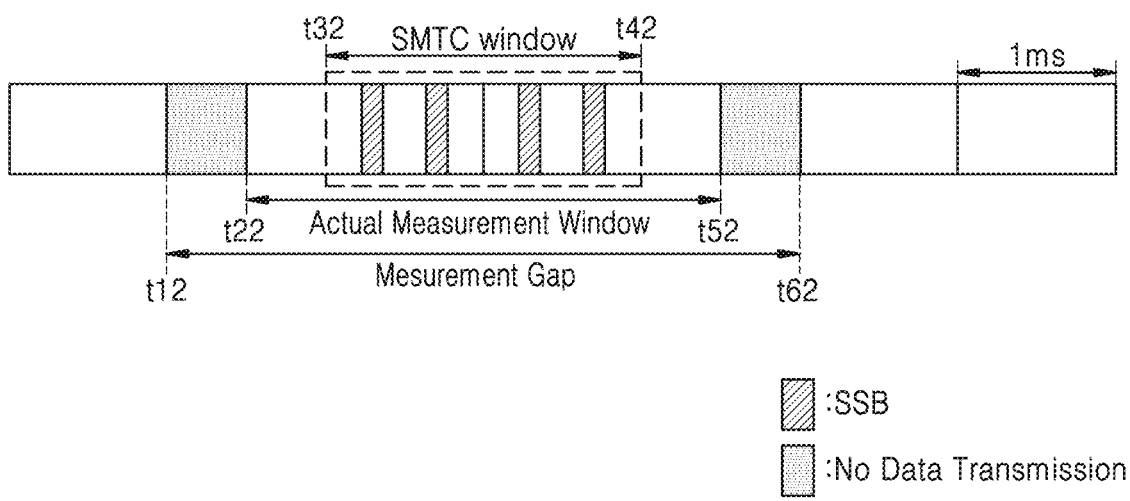

FIGS. 8A and 8B are diagrams for describing an interval where monitoring of a wireless communication device, according to embodiments, is performed.

Referring to FIG. 8A, a synchronization signal block (SSB) may include a primary synchronization signal (PSS), a secondary synchronization signal (SSS), and a physical broadcast channel (PBCH). For example, the SSB may include four symbols, and the PSS, the SSS, and the PBCH may be placed at positions corresponding to certain resource blocks (RB) in a frequency-axis direction. Also, one resource block (RB) may include twelve continuous subcarriers. For example, a PSS corresponding to a first symbol may be transmitted to a terminal through 127 subcarriers. In embodiments, the PSS and the SSS may each be a signal having strength which is measured for generating an indicator representing the signal quality of antenna modules.

In embodiments, each SSB measurement timing configuration (SMTC) window may be placed at first to second times t11 to t21 and third to fourth times t31 to t41. The SMTC window may include an SSB and may denote a time which is assigned to the wireless communication device so as to (e.g., during which to) measure the SSB. In the SMTC window, a base station may not transmit a control signal or a data signal in addition to the SSB. In embodiments, the wireless communication device may perform a monitoring operation on an unselected antenna module in the SMTC window. The SMTC window may be repeated at a certain period T, and the wireless communication device may set a monitoring period on the basis of a period T of the SMTC window. In embodiments, the wireless communication device may set the monitoring period on the basis of another window instead of the SMTC window, and in this case, a signal used in the monitoring operation may be a reference signal other than the SSB.

Referring further to FIG. 8B, first to sixth times t12 to t62 may be a measurement gap and may correspond to a gap for measuring an SSB of the wireless communication device. An actual measurement window may be placed at the second to fifth times t22 to t52, and the wireless communication device may measure the SSB in the actual measurement window. An SMTC window may be placed at the third to fourth times t32 to t42. The first to second times t12 to t22 and the fifth to sixth times t52 to t62 may be set to an interval where (e.g., in which) a data signal is not transmitted before and after the actual measurement window. In embodiments, the wireless communication device may perform a monitoring operation on an unselected antenna module in a measurement gap or the actual measurement window, which is wider than the SMTC window.

Figure 9A:
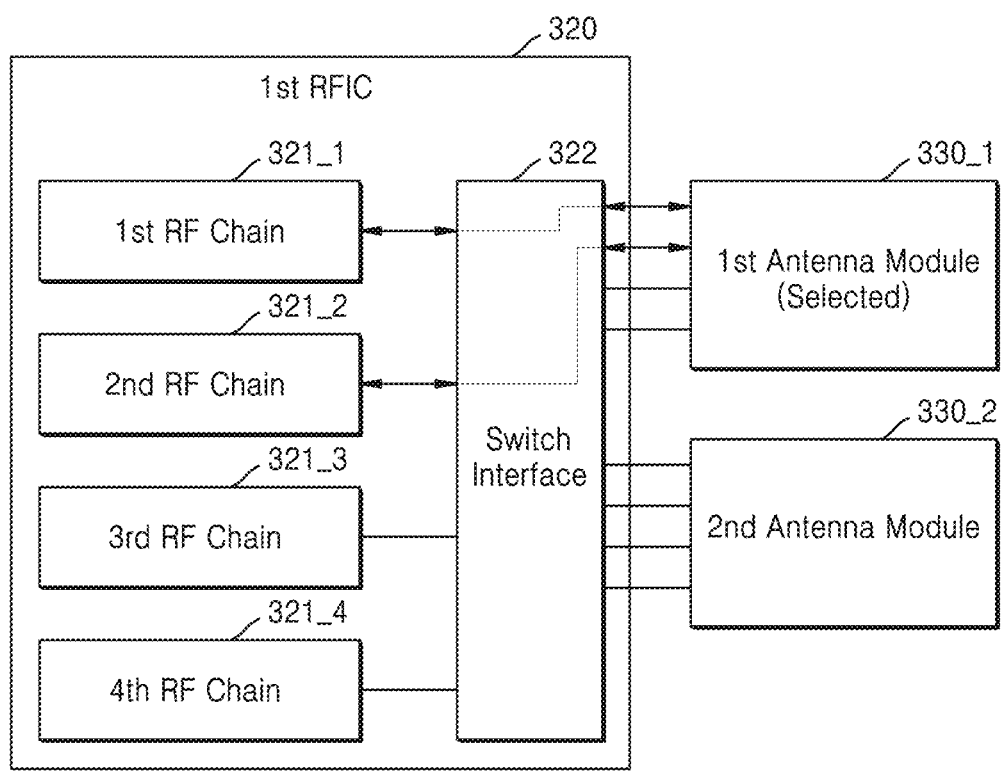
FIGS. 9A and 9B are diagrams for describing a radio frequency (RF) resource used in monitoring of a wireless communication device according to embodiments.
Figure 9B:
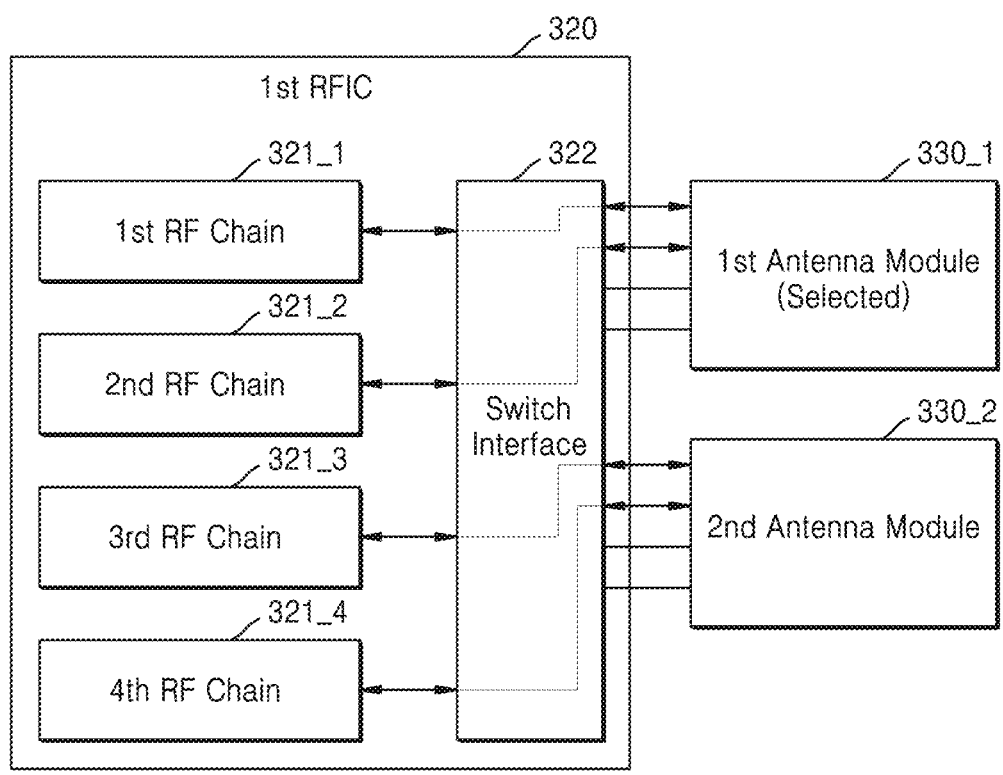

FIGS. 9A and 9B are diagrams for describing a radio frequency (RF) resource used in monitoring of a wireless communication device according to embodiments.

Referring to FIG. 9A, the wireless communication device may include a first RFIC 320 and/or first and second antenna modules 330_1 and 330_2. The wireless communication device may perform communication by using the first antenna module 330_1, and the first antenna module 330_1 may be in a state where the first antenna module 330_1 is connected to first and second RF chains 321_1 and 321_2. Third and fourth RF chains 321_3 and 321_4 may be in a state where a connection is released.

Referring further to FIG. 9B, the wireless communication device may connect the third and fourth RF chains 321_3 and 321_4 to the second antenna module 330_2 (e.g., using the switch interface 322) so as to monitor the signal quality of the second antenna module 330_2. The wireless communication device may transfer signals, received from the second antenna module 330_2 through the third and fourth RF chains 321_3 and 321_4, to a baseband processor.

However, the examples illustrated in FIGS. 9A and 9B are merely embodiments, embodiments are not limited thereto and an unselected antenna module may be monitored by variously using residual RF resources.

Figure 10:
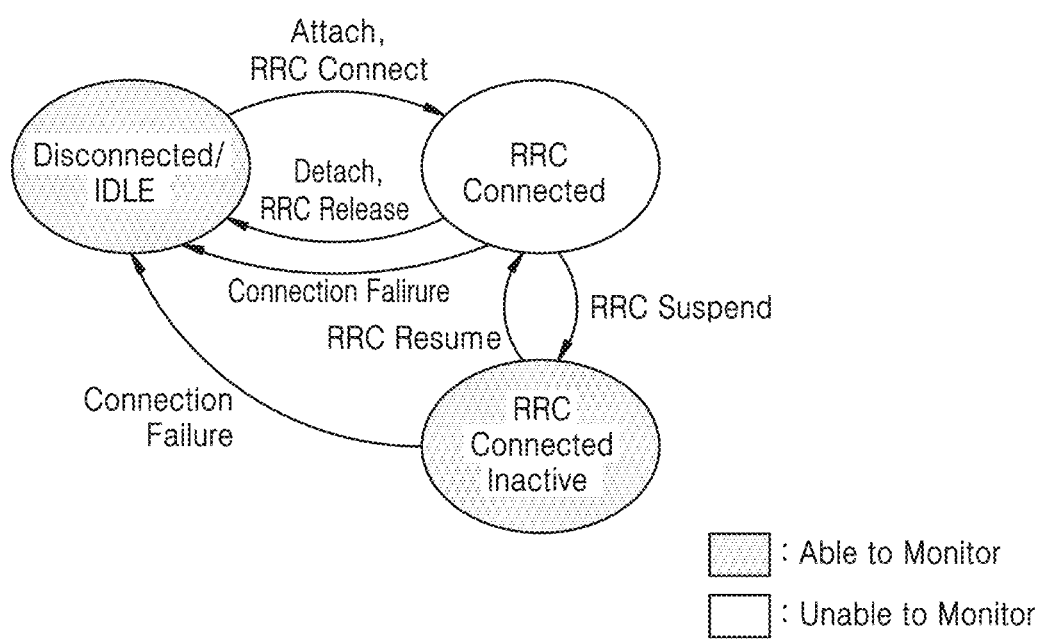
FIG. 10 is a diagram for describing a state where monitoring of a wireless communication device, according to embodiments, is performed.

FIG. 10 is a diagram for describing a state where monitoring of a wireless communication device, according to embodiments, is performed.

Referring to FIG. 10, the wireless communication device may be in one state among an RRC connected inactive state, an RRC disconnected state (or an idle state), and/or an RRC connected state with respect to a base station. The wireless communication device may be changed from the RRC disconnected state (or the idle state) to the RRC connected state through an access or RRC connection operation. The wireless communication device may be changed from the RRC connected state to the RRC disconnected state (or the idle state) through connection release, RRC release, or connection failure. The wireless communication device may be changed from the RRC connected inactive state to the RRC disconnected state (or the idle state) through connection failure. The wireless communication device may be changed from the RRC connected inactive state to the RRC connected state through RRC resume and may be changed from the RRC connected state to the RRC connected inactive state through RRC suspend.

In embodiments, the wireless communication device may monitor an unselected antenna module in at least one state of the RRC connected inactive state and the RRC disconnected state (or the idle state).

However, examples illustrated in FIG. 10 are merely embodiments, are not limited thereto and an unselected antenna module may be monitored in a mode or a state for minimizing (or reducing) a hindrance to communication. For example, the wireless communication device may perform a monitoring operation on an unselected antenna module in a certain gap or a certain window described above with reference to FIGS. 8A and 8B despite being in the RRC connected state.

Figure 11A:
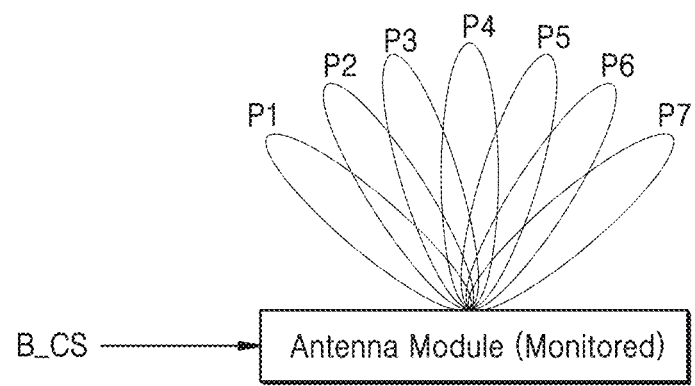
FIGS. 11A to 11C are diagrams for describing reception beam patterns formed in an antenna module in a monitoring operation according to embodiments.
Figure 11B:
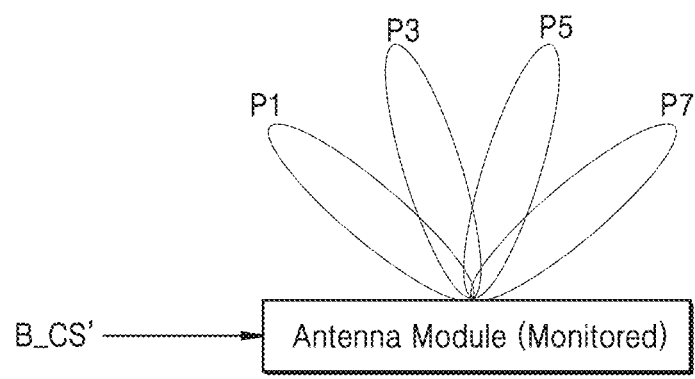
Figure 11C:
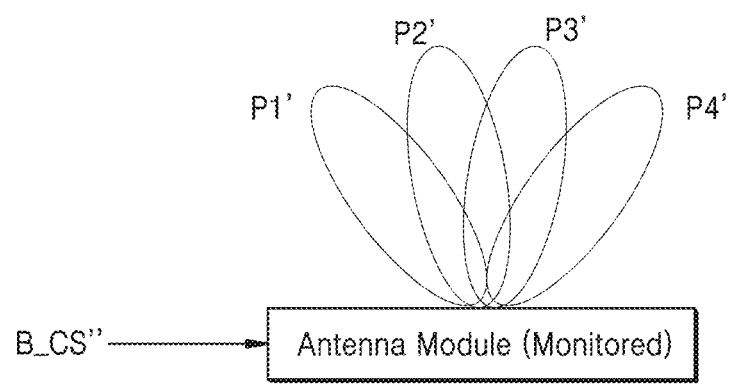

FIGS. 11A to 11C are diagrams for describing reception beam patterns formed in an antenna module in a monitoring operation according to embodiments.

Referring to FIG. 11A, in a monitoring operation, an antenna module may sweep reception beam patterns P1 to P7, which are the same as (or similar to) reception beam patterns in an initial operation, in response to a beam control signal B_CS.

Referring further to FIG. 11B, in a monitoring operation, an antenna module may be swept to some reception beam patterns P1, P3, P5, and P7 among reception beam patterns in an initial operation, in response to a beam control signal B_CS'. That is, in the monitoring operation, an indicator representing the signal quality of the antenna module may be generated by using fewer reception beam patterns P1, P3, P5, and P7 than the number of reception beam patterns in the initial operation.

Referring further to FIG. 11C, in a monitoring operation, an antenna module may be swept to reception beam patterns P1' to P4' which differ in shape and number from the reception beam patterns P1 to P7 in an initial operation (illustrated in FIG. 11A), in response to a beam control signal B_CS". That is, in the monitoring operation, an indicator representing the signal quality of the antenna module may be generated by using reception beam patterns P1' to P4' which differ from the reception beam patterns in the initial operation.

Figure 12:
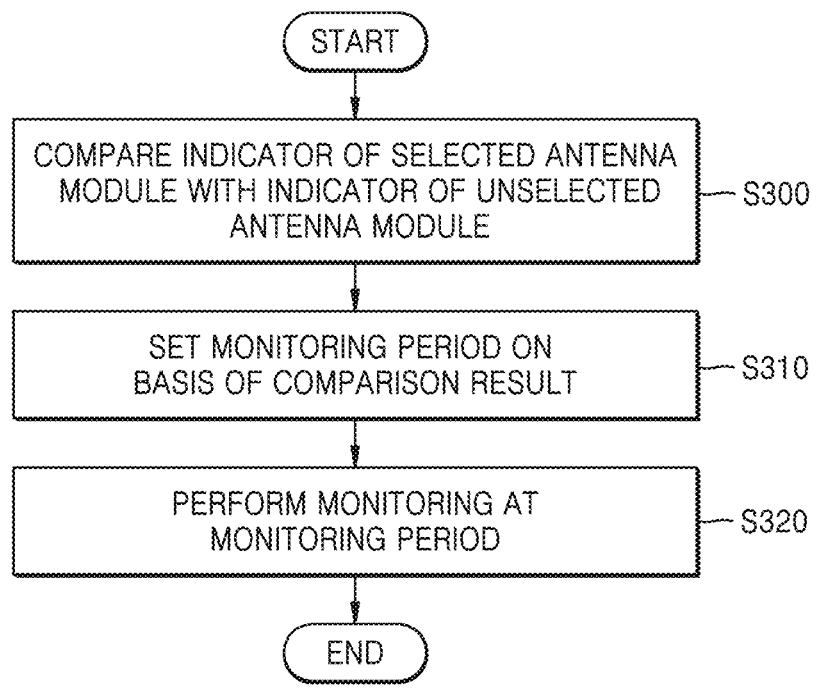
FIG. 12 is a flowchart for describing a monitoring method of a wireless communication device according to embodiments.

FIG. 12 is a flowchart for describing a monitoring method of a wireless communication device according to embodiments.

Referring to FIG. 12, in operation S300, the wireless communication device may compare an indicator of an unselected antenna module with an indicator of an antenna module, which is selected in an initial operation. Here, for example, the unselected antenna module may be an antenna module having an indicator, which is second better than the indicator of the selected antenna module. According to embodiments, the unselected antenna module may be one of three or more antenna modules, and the indicator of the unselected antenna module may be worse (e.g., indicate a lower signal quality) than the selected antenna module and may be better (e.g., indicate a higher signal quality) than the other antenna modules. In operation S310, the wireless communication device may set (e.g., variably set) a monitoring period on the basis of a comparison result. For example, as a difference between indicators increases, the monitoring period may be set to be longer, and as the difference between the indicators decreases, the monitoring period may be set to be shorter. In operation S320, the wireless communication device may perform monitoring at a predetermined or alternatively given monitoring period.

As described above, when a selected antenna module has a signal quality which is far better than the signal quality of other antenna modules, the wireless communication device according to embodiments may set a longer monitoring period, and thus, RF resources and power consumed in a monitoring operation may be minimized or reduced.

Figure 13:
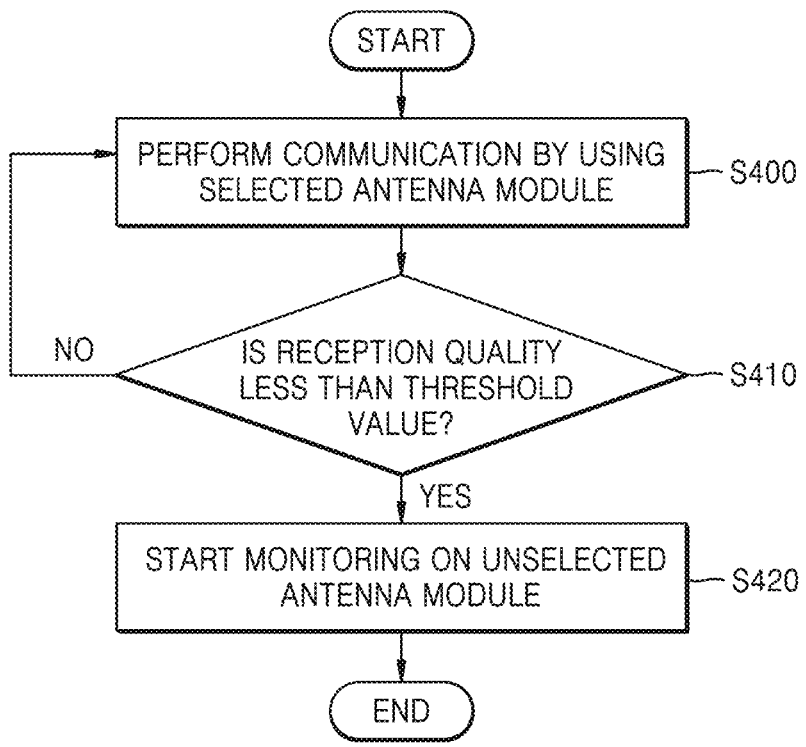
FIG. 13 is a flowchart for describing a monitoring operation start method of a wireless communication device according to embodiments.

FIG. 13 is a flowchart for describing a monitoring operation start method of a wireless communication device according to embodiments.

Referring to FIG. 13, in operation S400, the wireless communication device may perform communication with a base station or another device by using a selected antenna module. In operation S410, the wireless communication device may determine whether the reception quality of the selected antenna module is less than a threshold value. In embodiments, the wireless communication device may determine whether the strength of each of signals received through the selected antenna module, or an indicator determined from the strength, is less than a threshold value. When 'NO' results in operation S410, the wireless communication device may repeat operation S400 and operation S410. When 'YES' results in operation S410, the wireless communication device may start monitoring performed on an unselected antenna module in operation S5420.

As described above, only when the reception quality of a selected antenna module is less than a threshold value, the wireless communication device according to embodiments may perform a monitoring operation, and thus, RF resources and power consumed in the monitoring operation may be minimized or reduced.

Figure 14:
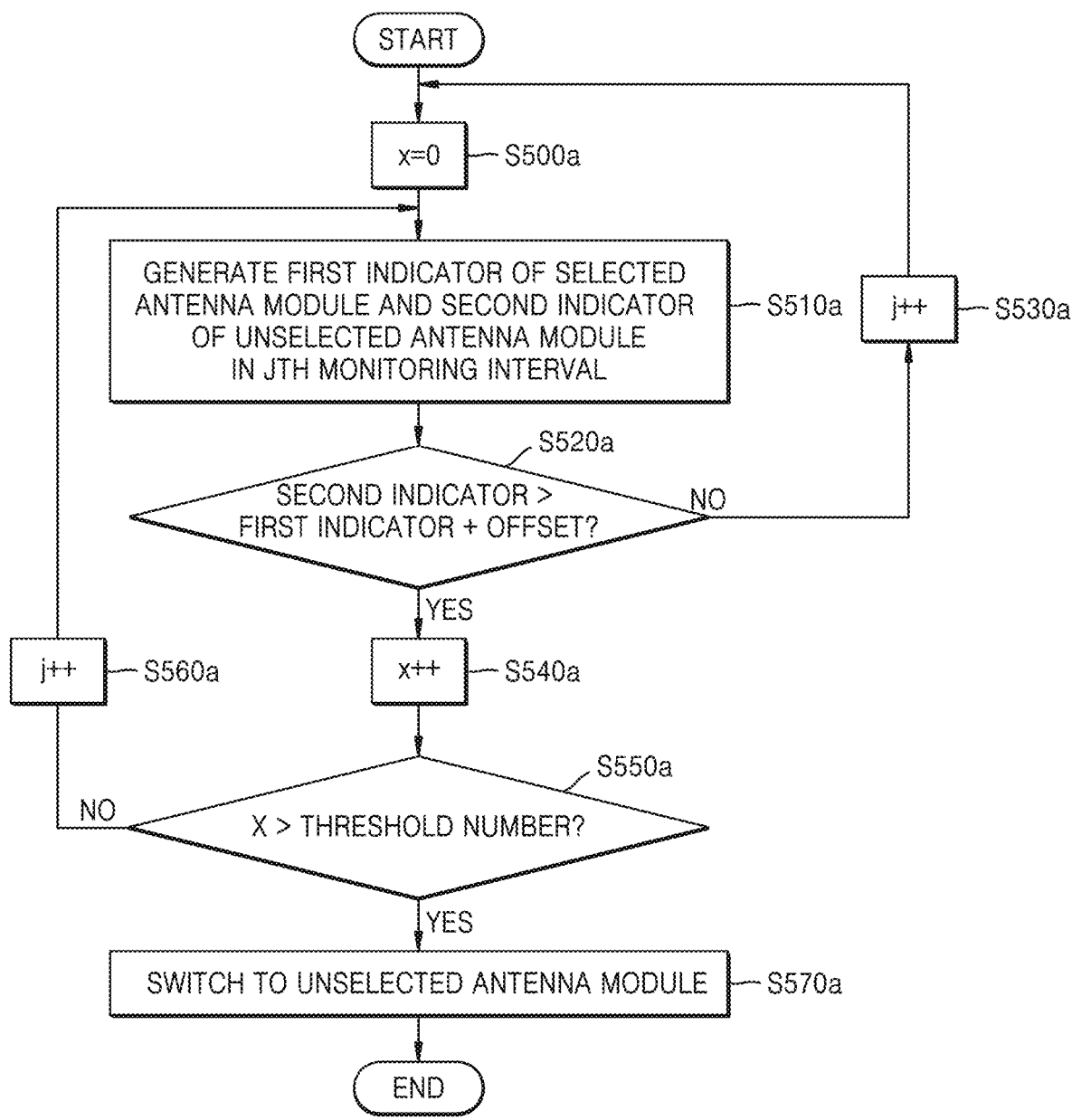
FIGS. 14 and 15 are flowcharts for describing a switching method of a wireless communication device according to embodiments.
Figure 15:
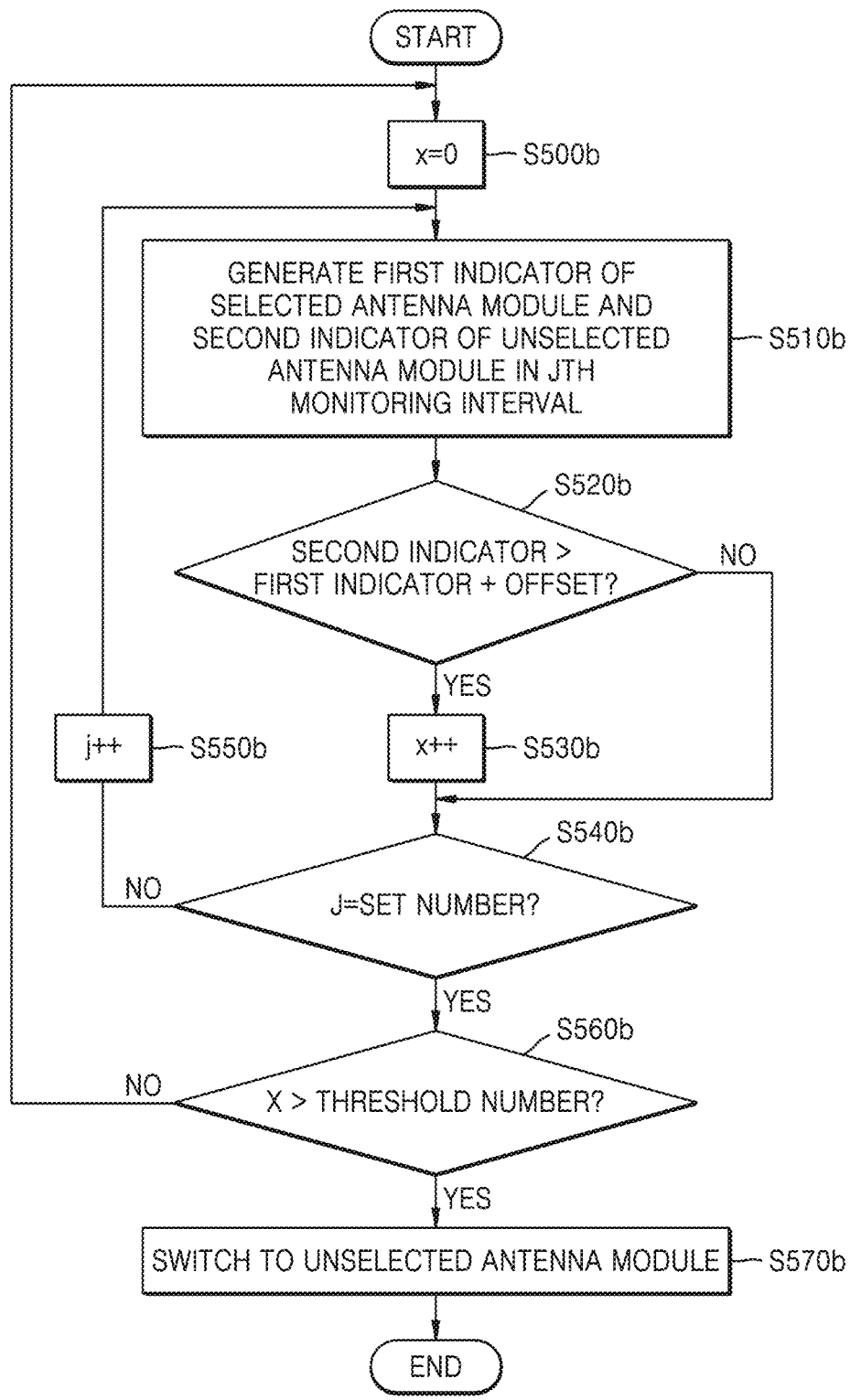

FIGS. 14 and 15 are flowcharts for describing a switching method of a wireless communication device according to embodiments. Hereinafter, for convenience of description, an unselected antenna module is described as singular, but a plurality of unselected antenna modules may be provided.

Referring to FIG. 14, in operation S500a, the wireless communication device may initialize 'x' to 0. In operation S510a, the wireless communication device may generate a first indicator of an antenna module, selected in a $j^{th}$ monitoring interval, and a second indicator of an unselected antenna module. In operation S520a, the wireless communication device may determine whether the second indicator is greater than a value (e.g., intermediate value) obtained by summating (or summing) the first indicator and an offset. When 'NO' results in operation S520a, the wireless communication device may count up (e.g., increment) T in operation S530a subsequent thereto, and then, operation S500a may be performed again. When 'YES' results in operation S520a, the wireless communication device may count up (e.g., increment) 'x' in operation S540a subsequent thereto. In operation S550a, the wireless communication device may determine whether 'x' is more than a threshold number. When 'YES' results in operation S550a, the wireless communication device may switch to the unselected antenna module in operation S570a subsequent thereto. When 'NO' results in operation S550a, the wireless communication device may count up (e.g., increment) 'j' in operation S560a subsequent thereto, and then, operation S510a may be performed again.

In embodiments, the wireless communication device may perform a switching operation of switching to an unselected antenna only when the number of continuous second indicators (e.g., the number of continuously generated second indicators), which are greater than values obtained by adding the offset to each of first indicators, of second indicators of the unselected antenna module in a plurality of monitoring intervals is more than a threshold number. According to embodiments, the number of continuous second indicators represents a time period corresponding to the threshold number used in operation S550a, and operation S570a is only performed after the second indicators remain greater than the corresponding sums of first indicator and offset for the time period.

Referring further to FIG. 15, in operation S500b, the wireless communication device may initialize 'x' to 0. According to embodiments, the wireless communication device may initialize 'j' to 0 prior to the start of the method illustrated in FIG. 15. In operation S510b, the wireless communication device may generate a first indicator of an antenna module, selected in a $j^{th}$ monitoring interval, and a second indicator of an unselected antenna module. In operation S520b, the wireless communication device may determine whether the second indicator is greater than a value (e.g., intermediate value) obtained by summating (or summing) the first indicator and an offset. When 'YES' results in operation S520b, the wireless communication device may count up (e.g., increment) 'x' in operation S530b subsequent thereto. When 'NO' results in operation S520b, operation S530b may be skipped. In operation S540b, the wireless communication device may determine whether T reaches a set number. When 'NO' results in operation S540b, the wireless communication device may count up (or increment) 'j' in operation S550 subsequent thereto, and then, operation S510b may be performed again. When 'YES' results in operation S540b, the wireless communication device may determine whether 'x' is more than a threshold number, in operation S560b subsequent thereto. When 'YES' results in operation S560b, the wireless communication device may switch to the unselected antenna module in operation S570b subsequent thereto. When 'NO' results in operation S560b, operation S500b may be performed again subsequently.

In embodiments, the wireless communication device may perform a switching operation of switching to an unselected antenna only when the number of second indicators, which are greater than values obtained by adding the offset to each of first indicators, of second indicators of the unselected antenna module in a plurality of monitoring intervals is more than a threshold number. According to embodiments, operation S570b is only performed if a number of second indicators greater than the corresponding sums of first indicator and offset among the second indicators generated in the set number of monitoring intervals is higher than the threshold number.

In embodiments, at least one of the offset and/or the threshold number may be variably set based on a channel state and/or a communication environment of the wireless communication device. This will be described below in detail with reference to FIGS. 16A and 16B.

Figure 16A:
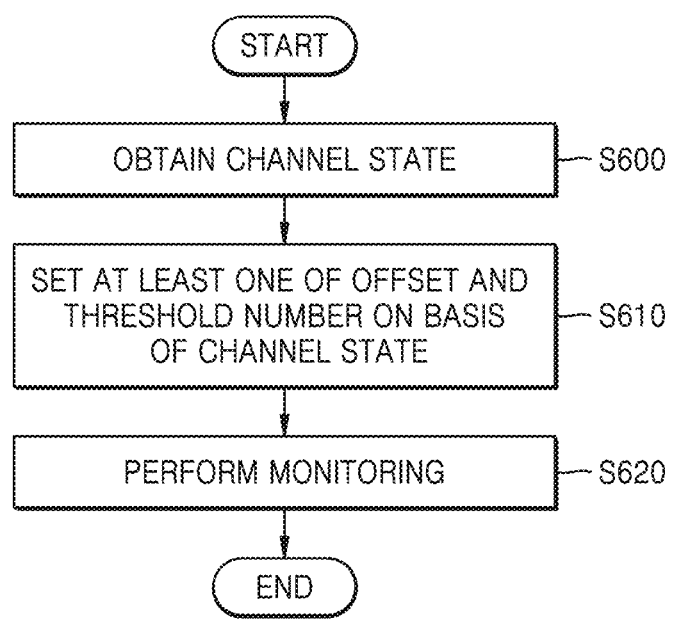

FIGS. 16A and 16B are diagrams for describing a method of setting an offset and threshold number of a wireless communication device according to embodiments.

Referring to FIG. 16A, in operation S600, the wireless communication device may obtain a current channel state (or a communication environment). In embodiments, the wireless communication device may obtain a channel state by using a synchronization signal or a reference signal. According to embodiments, the wireless communication device may obtain the channel state (e.g., signal strength, signal quality, interference level, signal delay, etc.) using a synchronization signal or a reference signal received via the selected antenna module. In operation S610, the wireless communication device may set at least one of an offset and/or a threshold number on the basis of the channel state. For example, at least one of the offset and/or the threshold number may be set to have a value which decreases as the channel state or the communication environment improves (e.g., signal quality increases), and at least one of the offset and/or the threshold number may be set to have a value which increases as the channel state or the communication environment is worsens (e.g., signal quality decreases). In operation S620, the wireless communication device may perform monitoring on the basis of the offset and the threshold number which are set. An operation performed in operation S620 has been described in detail with reference to FIGS. 14 and 15, and thus, is omitted.

Referring to FIG. 16B, the wireless communication device may set at least one of the offset and/or the threshold number with reference to table TB. In embodiments, in a first channel state ST1, the threshold number may be set to a first number N1 and the offset may be set to a first offset OS1. In a second channel state ST2, the threshold number may be set to a second number N2 and the offset may be set to a second offset OS2. In a third channel state ST3, the threshold number may be set to a third number N3 and the offset may be set to a third offset OS3. For example, the table TB may be stored in the memory 160 of FIG. 2.

The wireless communication device according to embodiments may dynamically change a switching condition including the offset and/or the threshold number on the basis of a change in reliability of a monitoring result based on the channel state and/or the communication environment, thereby ensuring a stable communication operation (or increasing the stability of the communication operation).

Figure 17:
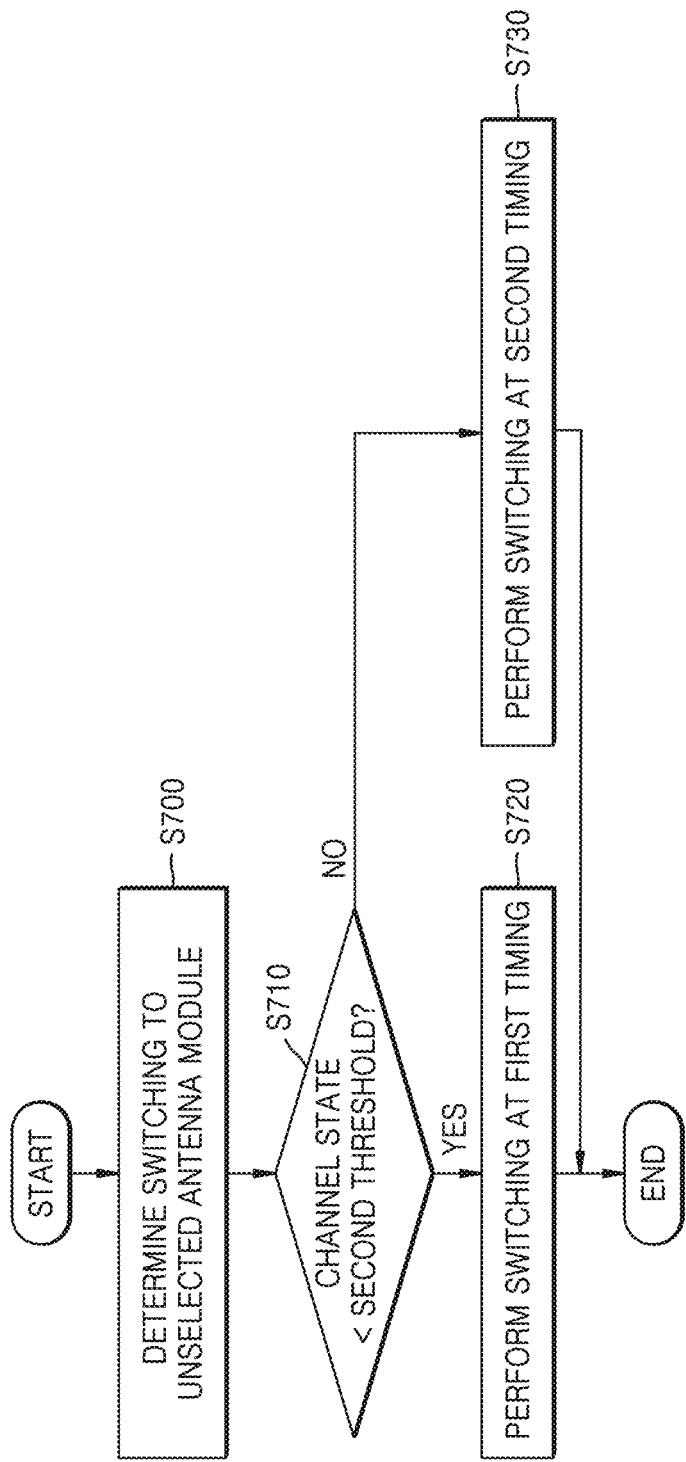
FIG. 17 is a flowchart for describing a switching method of a wireless communication device according to embodiments.

FIG. 17 is a flowchart for describing a switching method of a wireless communication device according to embodiments.

Referring to FIG. 17, in operation S700, the wireless communication device may determine to switch to an unselected antenna. In operation S710, the wireless communication device may determine whether a channel state and/or a communication environment of the wireless communication device is less than a second threshold value. When 'YES' results in operation S710, the wireless communication device may perform switching at a first timing in operation S720. For example, the first timing may be a relatively fast timing, and the wireless communication device may quickly perform a switching operation despite a reduction in reception loss. When 'NO' results in operation S710, the wireless communication device may perform switching at a second timing in operation S730. For example, the second timing may be a relatively slow timing, and the wireless communication device may perform a switching operation at a timing for minimizing (or reducing) reception loss. In embodiments, operation S730 may be performed in an interval, where the monitoring of FIGS. 8A and 8B is performed, or in a certain state of the wireless communication device of FIG. 10.

Figure 18:
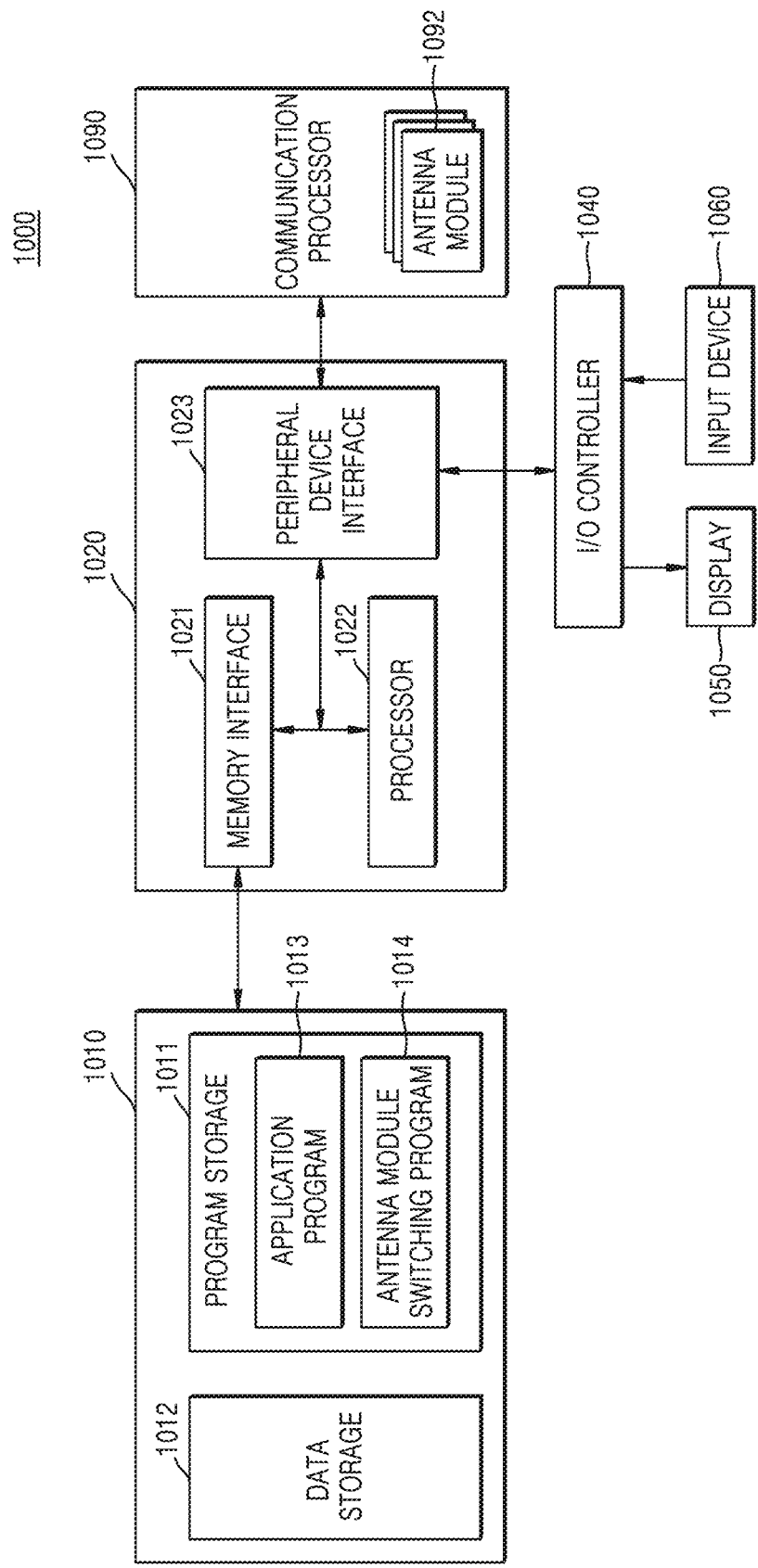
FIG. 18 is a block diagram illustrating an electronic device according to embodiments.

FIG. 18 is a block diagram illustrating an electronic device 1000 according to embodiments.

Referring to FIG. 18, the electronic device 1000 may include a memory 1010, a processor unit 1020, an input/output (I/O) controller 1040, a display 1050, an input device 1060, and/or a communication processor 1090. Here, the memory 1010 may be provided in plurality. Each of the elements will be described below.

The memory 1010 may include a program storage 1011, storing a program for controlling an operation of the electronic device 1000, and a data storage 1012, which stores data generated in executing the program. The data storage 1012 may store data used for operations of an application program 1013 and/or an antenna module switching program 1014. The program storage 1011 may include (e.g., store) the application program 1013 and/or the antenna module switching program 1014. Here, the program stored in the program storage 1011 may be a set of instructions and may be referred to as an instruction set.

The application program 1013 may include an application program which is executed in the electronic device 1000. That is, the application program 1013 may include an instruction of an application driven by the processor 1022. The antenna module switching program 1014 may generate indicators representing the reception quality of a plurality of antenna modules 1092 in an initial operation according to embodiments and may select an antenna module on the basis of the indicators. Also, the antenna module switching program 1014 may generate indicators representing the reception quality of the plurality of antenna modules 1092 in a monitoring operation according to embodiments and may perform an antenna module switching operation on the basis of the indicators.

A peripheral device interface 1023 may control a connection between an I/O peripheral device, the processor 1022, and a memory interface 1021. The processor 1022 may perform control so that the electronic device 1000 provides a corresponding service, on the basis of at least one software program. At this time, the processor 1022 may execute at least one program stored in the memory 1010 to provide a service corresponding to a corresponding program.

The I/O controller 1040 may provide an interface between the peripheral device interface 1023 and I/O devices such as the display 1050 and/or the input device 1060. The display 1050 may display state information, an input letter, a moving picture, and/or a still picture. For example, the display 1050 may display application program information driven by the processor 1022.

The input device 1060 may provide input data, generated by a selection of (e.g., input into) the electronic device 1000, to the processor unit 1020 through the I/O controller 1040. In this case, the input device 1060 may include a keypad, including at least one hardware button, and/or a touch pad which senses touch information. For example, the input device 1060 may provide the processor 1022 with touch information, such as a touch sensed through the touch pad, a touch motion, or touch release, through the I/O controller 1040. The communication processor 1090 may perform a communication function for voice communication and/or data communication. The communication processor 1090 may include a plurality of antenna modules 1092 for supporting communication of the millimeter wave band according to embodiments.

Figure 19:
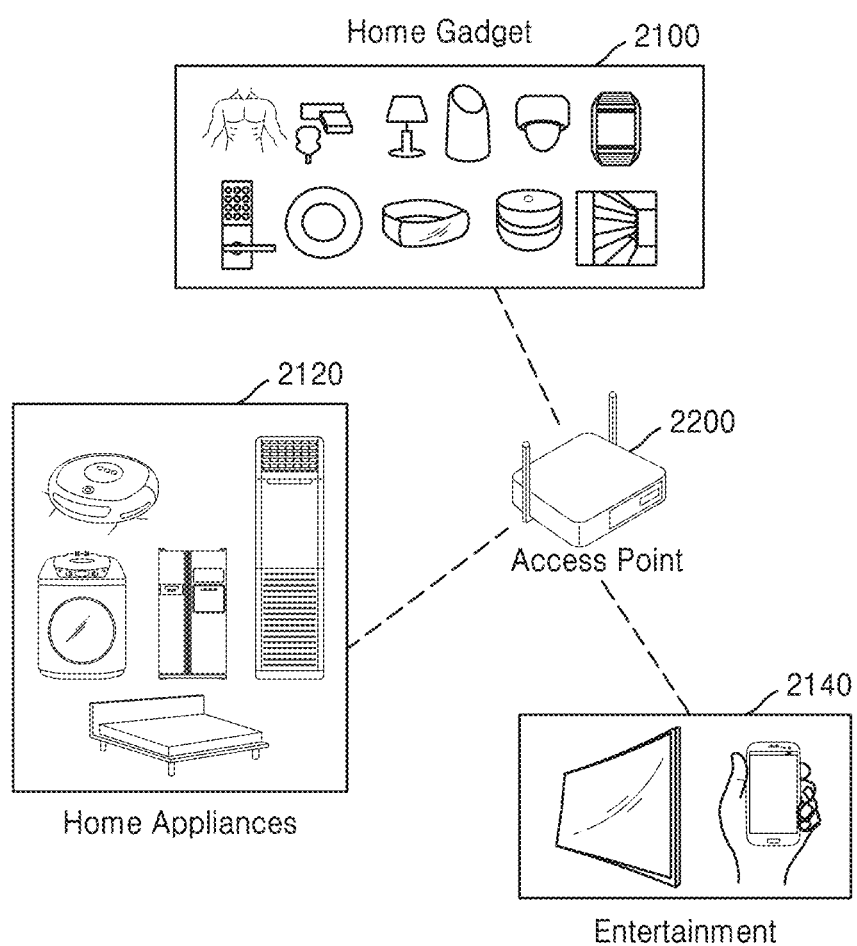
FIG. 19 is a diagram illustrating communication devices including a plurality of antenna modules, according to embodiments.

FIG. 19 is a diagram illustrating communication devices including a plurality of antenna modules, according to embodiments.

Referring to FIG. 19, each of a home gadget 2100, home appliances 2120, an entertainment device 2140, and/or an access point (AP) 2200 may perform an antenna module selection operation and an antenna module switching operation according to embodiments. In embodiments, the home gadget 2100, the home appliances 2120, the entertainment device 2140, and the AP 2200 may configure an Internet of things (IoT) network system. The communication devices illustrated in FIG. 19 are merely examples, and it may be understood that embodiments may be applied to other communication devices which are not illustrated in FIG. 19.

Conventional devices for beamforming communication include antenna modules in different positions on the devices. The conventional devices use the antenna modules to continuously perform beamforming with other devices (e.g., a base stations) while the respective positions of the conventional devices change. The conventional devices fail to switch between the antenna modules when the signal quality of a selected antenna module degrades due to the position changes of the conventional devices. Accordingly, the conventional devices fail to provide sufficient signal quality in communications with the other devices.

However, according to embodiments, improved devices for beamforming communication are provided. The improved devices monitor the strengths of signals received over the different antenna modules. The improved devices switch from a selected antenna module to another antenna module when the strengths of the signals received over the other antenna module become higher than those received over the selected antenna module due to position changes of the improved devices. Accordingly, the improved devices overcome the deficiencies of the conventional devices to improve signal quality in communications with other devices (e.g., base stations).

According to embodiments, operations described herein as being performed by the communication system 1, the base station BS, the wireless communication device 10, the first antenna module 12, the second antenna module 14, the wireless communication device 100, the baseband processor 110, the first RFIC 120, the first to $i^{th}$ antenna modules 130_1 to 130_i, the second RFIC 140, the signal quality measurement circuit 112, the switching control circuit 114, the first to $k^{th}$ RF chains 121_1 to 121_k, the first to $m^{th}$ antenna arrays 130_11 to 130_1m, the first to $n^{th}$ phase front-ends 131_11 to 131_1n, the first RFIC 120a, the first to $k^{th}$ RF chains 121_1a to 121_ka, the switch interface 122a, the first antenna module 130_1a, the first to $m^{th}$ antenna arrays 130_11a to 130_1ma, the first to $m^{th}$ combiners 133_1a to 133_ma, the first to $n^{th}$ phase front-ends 131_11a to 131_1na, the analog-digital converter ADC, the mixer MX, the variable gain amplifier VGA, the phase shifter PS, the low noise amplifier LNA, the wireless communication device 200a, the wireless communication device 200b, the first antenna module 211, the second antenna module 212, the third antenna module 213, the fourth antenna module 214, the system on chip 220, the first RFIC 320, the first antenna module 330_1, the second antenna module 330_2, the first RF chain 321_1, the second RF chain 321_2, the third RF chain 321_3, the fourth RF chain 321_4, the switch interface 322, the electronic device 1000, the processor unit 1020, the I/O controller 1040, the communication processor 1090, the application program 1013, the antenna module switching program 1014, the plurality of antenna modules 1092, the peripheral device interface 1023, the processor 1022, the memory interface 1021, the home gadget 2100, the home appliances 2120, the entertainment device 2140 and/or the AP 2200 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory 160, the memory 1010, etc.). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to embodiments thereof, it will be understood that various changes in form and details may be made therein without departing from the spirit and scope of the following claims.

What is claimed is:

1. A wireless communication device comprising:
   a plurality of antenna modules, each of the plurality of antenna modules including a plurality of antennas;
   a processor configured to perform a first operation of generating indicators for the plurality of antenna modules based on strengths of signals received through a plurality of receiving beam patterns respectively formed on the plurality of antenna modules, and perform a second operation of selecting any one of the plurality of antenna modules based on the indicators; and
   a radio frequency (RF) integrated circuit connected to at least one of the plurality of antenna modules under control of the processor, wherein the processor is further configured to control performing a communication operation using any one of receiving beam patterns formable by the selected antenna module.

2. The wireless communication device of claim 1, wherein the processor is further configured to extract a respective maximum strength value of each corresponding antenna module among the plurality of antenna modules based on the strengths of the received signals to obtain an extracting result, the respective maximum strength value being a highest strength among the strengths of signals received through the plurality of receiving beam patterns formed on the corresponding antenna module, and generate the indicators for the plurality of antenna modules based on the extracting result.

3. The wireless communication device of claim 1, wherein the processor is further configured to calculate respective average strength value of each corresponding antenna module among the plurality of antenna modules based on the strengths of the received signals to obtain a calculating result, the respective average strength value being an average of the strengths of signals received through the plurality of receiving beam patterns formed on the corresponding antenna module and generate the indicators for the plurality of antenna modules based on the calculating result.

4. The wireless communication device of claim 1, wherein the processor is further configured to determine the strengths of the received signals based on at least one of reference signal received power (RSRP), reference signal received quality (RSRQ), a signal to interference plus noise ratio (SINR), a received signal strength indicator (RSSI), a reference signal correlation, or a variable gain index.

5. The wireless communication device of claim 1, wherein the processor is further configured to perform the first operation in an initial operation for the wireless communication and in a monitoring operation for antenna module switching.

6. The wireless communication device of claim 5, wherein the processor is further configured to control the plurality of antenna modules to form the plurality of receiving beam patterns in the initial operation to be different from the plurality of receiving beam patterns in the monitoring operation.

7. The wireless communication device of claim 5, wherein the processor is further configured to control the plurality of antenna modules such that a number of the plurality of receiving beam patterns in the initial operation is greater than a number of the plurality of receiving beam patterns in the monitoring operation.

8. The wireless communication device of claim 5, wherein the processor is further configured to, in the monitoring operation, perform the first operation within a synchronization signal block (SSB) measurement timing configuration (SMTC) window, or perform the first operation using extra RF chains that are not used in a current wireless communication by the RF integrated circuit.

9. The wireless communication device of claim 5, wherein the processor is further configured to, in the monitoring operation, selectively perform the first operation for some of the plurality of antenna modules based on switching history information.

10. The wireless communication device of claim 1, wherein the RF integrated circuit comprises a plurality of RF chains, each of the plurality of RF chains comprising:
a variable gain amplifier;
a mixer configured to receive a frequency signal for frequency down-conversion; and
an analog-digital converter.

11. A wireless communication device comprising:
a first antenna module including a first plurality of antennas;
a second antenna module including a second plurality of antennas; and
a processor configured to perform a wireless communication with a base station by using the first antenna module,
wherein the processor is further configured to:
form a plurality of receiving beam patterns in each of the first and second antenna modules in a predetermined period;
generate a first indicator of the first antenna module and a second indicator of the second antenna module based on strengths of signals received through the plurality of receiving beam patterns; and
determine whether to switch from the first antenna module to the second antenna module based on a result of comparing between the first and second indicators.

12. The wireless communication device of claim 11, wherein the predetermined period includes a period in which no data signal is received from the base station.

13. The wireless communication device of claim 11, wherein the received signals correspond to any one of a synchronization signal and a reference signal.

14. The wireless communication device of claim 11, wherein the processor is further configured to add an offset to the first indicator and compare the first indicator with the second indicator.

15. The wireless communication device of claim 14, wherein the processor is further configured to set the offset to have a value which decreases as a channel state corresponding to the base station improves.

16. The wireless communication device of claim 11, wherein the processor is further configured to, when switching from the first antenna module to the second antenna module is determined, determine a switching timing based on a channel state corresponding to the base station.

17. The wireless communication device of claim 11, further comprising an RF integrated circuit comprising a plurality of RF chains,
wherein the processor is further configured to control such that some of the plurality of RF chains are disconnected in a period other than the predetermined period, and the some of the plurality of RF chains are connected to the second antenna module in the predetermined period.

18. The wireless communication device of claim 11, wherein the processor is further configured to initiate an operation in the predetermined period when receiving quality of the first antenna module is less than a threshold value.

19. The wireless communication device of claim 11, wherein, in the predetermined period, the processor is in any one of a radio resource control (RRC) connected inactive state, an RRC disconnected state, or an idle state with respect to the base station.

20. The wireless communication device of claim 11, wherein the first and second antenna modules are configured to support communication in a millimeter wave band.

* * * * *